(12) United States Patent
Sato

(10) Patent No.: US 12,326,424 B2
(45) Date of Patent: Jun. 10, 2025

(54) SIGNAL PROCESSING METHOD, SIGNAL PROCESSING DEVICE, AND MONITORING SYSTEM

(71) Applicant: Seiko Epson Corporation, Tokyo (JP)

(72) Inventor: Kenta Sato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 576 days.

(21) Appl. No.: 17/485,684

(22) Filed: Sep. 27, 2021

(65) Prior Publication Data
US 2022/0099633 A1   Mar. 31, 2022

(30) Foreign Application Priority Data
Sep. 28, 2020   (JP) ................ 2020-161841

(51) Int. Cl.
| *G01N 29/44* | (2006.01) |
| *G01N 29/46* | (2006.01) |
| *G06F 3/14* | (2006.01) |

(52) U.S. Cl.
CPC ......... *G01N 29/4454* (2013.01); *G01N 29/46* (2013.01); *G06F 3/14* (2013.01)

(58) Field of Classification Search
CPC ....... G01N 29/4454; G01N 29/46; G06F 3/14
See application file for complete search history.

(56) References Cited

U.S. PATENT DOCUMENTS

| 2008/0033695 | A1* | 2/2008 | Sahara ................. | G01H 1/003 |
| | | | | 702/185 |
| 2011/0270579 | A1* | 11/2011 | Watson ................. | G16H 40/40 |
| | | | | 702/189 |
| 2016/0076970 | A1* | 3/2016 | Takahashi ............. | G06N 20/00 |
| | | | | 702/33 |
| 2017/0307689 | A1 | 10/2017 | Muramatsu | |

FOREIGN PATENT DOCUMENTS

| JP | H05-060596 A | 3/1993 |
| JP | H10-026613 A | 1/1998 |
| JP | 2000-258305 A | 9/2000 |

(Continued)

OTHER PUBLICATIONS

Signal Processing for Effective Vibration Analysis (Year: 1999).*
(Continued)

*Primary Examiner* — Mohamed Charioui
*Assistant Examiner* — Dacthang P Ngo
(74) *Attorney, Agent, or Firm* — Harness, Dickey & Pierce, P.L.C.

(57) ABSTRACT

A signal processing method includes generating N data sequences by dividing i-th measurement data based on a signal output from an i-th sensor that detects a physical quantity generated due to a vibration of a target object, for each integer i of 1 or more and M or less, where N is a predetermined integer of 2 or more, and M is a predetermined integer of 2 or more, generating an i-th averaged data sequence by averaging the N data sequences generated by dividing the i-th measurement data, for each integer i of 1 or (Continued)

more and M or less, and generating a Lissajous figure in which the i-th averaged data sequence is assigned to an i-th axis, for each integer i of 1 or more and M or less.

13 Claims, 22 Drawing Sheets

(56) References Cited

FOREIGN PATENT DOCUMENTS

| | | | |
|---|---|---|---|
| JP | 2004-317378 A | 11/2004 | |
| JP | 2010-216938 A | 9/2010 | |
| JP | 2017122635 | * 7/2017 | ............. Y02E 10/72 |
| JP | 2017-194368 A | 10/2017 | |
| JP | 2019-065828 A | 4/2019 | |

OTHER PUBLICATIONS

JP2017122635 English translation (Year: 2017).*
A new methodology for vibration error compensation of optical encoder (Year: 2012).*

* cited by examiner

SIGNAL PROCESSING METHOD, SIGNAL PROCESSING DEVICE, AND MONITORING SYSTEM

The present application is based on, and claims priority from JP Application Serial Number 2020-161841, filed Sep. 28, 2020, the disclosure of which is hereby incorporated by reference herein in its entirety.

BACKGROUND

1. Technical Field

The present disclosure relates to a signal processing method, a signal processing device, and a monitoring system.

2. Related Art

In JP-A-2000-258305 describes an abnormality diagnostic device for a bearing portion of a rotating machine, which includes a vibration detection section that detects each of vibrations at a predetermined position on at least two axes orthogonal to each other on the same plane with an axis center of the rotating machine as the center and outputs a vibration waveform signal, a Lissajous waveform diagram generation section that generates a Lissajous waveform diagram based on both vibration waveform signals, a reference Lissajous waveform diagram setting section that presets and stores a plurality of reference Lissajous waveform diagrams, each of which is assumed based on the cause of each abnormality, and an abnormal cause determination section that compares the Lissajous waveform diagram with each reference Lissajous waveform diagram, determines the cause of the abnormality, and outputs the result.

The method described in JP-A-2000-258305 is effective in a situation where the signal component of one frequency is predominant in the vibration waveform signal, but in reality, since the vibration waveform signal has various high frequency and low frequency fluctuations, the waveform of the Lissajous figure is disturbed, and there are cases where it is difficult to see the information necessary for the abnormality detection.

SUMMARY

A signal processing method according to an aspect of the present disclosure includes: a measurement data division step of generating N data sequences by dividing i-th measurement data based on a signal output from an i-th sensor that detects a physical quantity generated due to a vibration of a target object, for each integer i of 1 or more and M or less, where N is a predetermined integer of 2 or more, and M is a predetermined integer of 2 or more; an averaged data sequence generation step of generating an i-th averaged data sequence by averaging the N data sequences generated by dividing the i-th measurement data, for each integer i of 1 or more and M or less; and a Lissajous figure generation step of generating a Lissajous figure in which the i-th averaged data sequence is assigned to an i-th axis, for each integer i of 1 or more and M or less.

A signal processing device according to another aspect of the present disclosure includes: a measurement data division circuit generating N data sequences by dividing i-th measurement data based on a signal output from an i-th sensor that detects a physical quantity generated due to a vibration of a target object, for each integer i of 1 or more and M or less, where N is a predetermined integer of 2 or more and M is a predetermined integer of 2 or more; an averaged data sequence generation circuit generating an i-th averaged data sequence obtained by averaging the N data sequences generated by dividing the i-th measurement data, for each integer i of 1 or more and M or less; and a Lissajous figure generation circuit generating a Lissajous figure in which the i-th averaged data sequence is assigned to an i-th axis, for each integer i of 1 or more and M or less.

A monitoring system according to still another aspect of the present disclosure, that monitors a state of a target object including a movable body and a housing that accommodates the movable body, the monitoring system includes: the signal processing device according to the aspect; and the first to M-th sensors attached to the housing, in which the signal processing device displays the Lissajous figure on a display device.

DESCRIPTION OF EXEMPLARY EMBODIMENTS

Hereinafter, a preferred embodiment of the present disclosure will be described in detail with reference to the accompanying drawings. Note that the embodiment to be described below does not unduly limit the contents of the disclosure described in the appended claims. In addition, all configurations to be described below are not limited to being essential constituent conditions of the disclosure.

1. Signal Processing Method and Signal Processing Device 1-1. First Embodiment 1-1-1. Signal Processing Method FIG. 1 is a flowchart illustrating a procedure of a signal processing method of a first embodiment.

Figure 1:
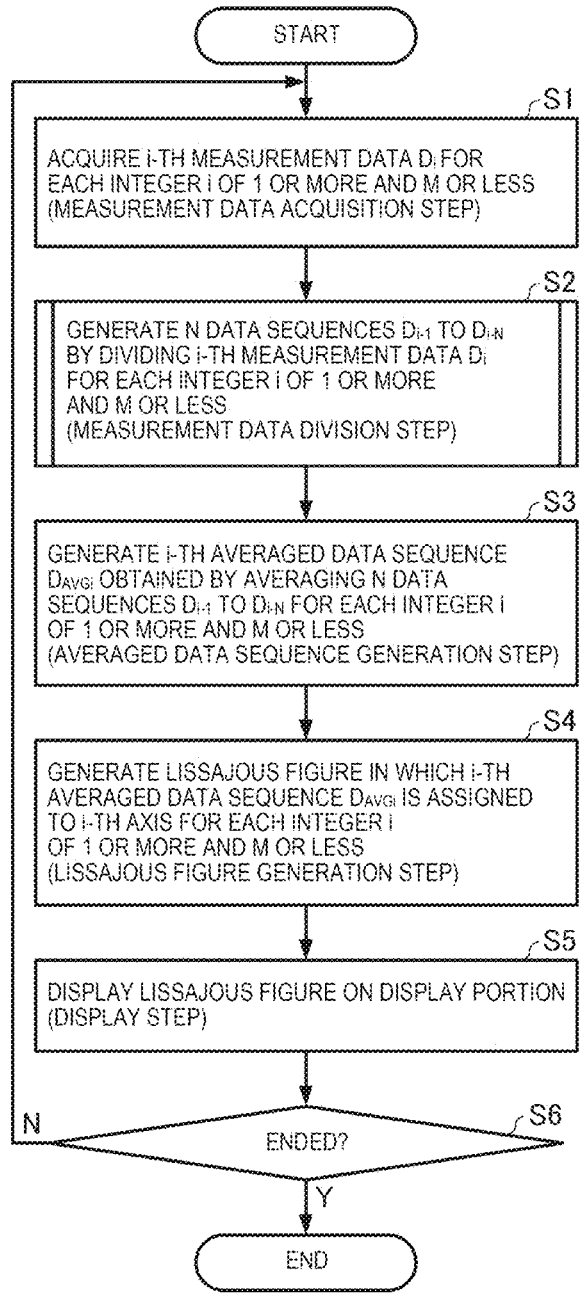
FIG. 1 is a flowchart illustrating a procedure of a signal processing method of a first embodiment.

As illustrated in FIG. 1, the signal processing method of the first embodiment includes a measurement data acquisition step S1, a measurement data division step S2, an averaged data sequence generation step S3, a Lissajous figure generation step S4, and a display step S5. Note that, in the signal processing method of the first embodiment, some of these steps may be omitted or changed, or other steps may be added. The signal processing method of the first embodiment is executed by, for example, a signal processing device 100. An example of a configuration of the signal processing device 100 that executes the signal processing method of the first embodiment will be described later.

As illustrated in FIG. 1, first, in the measurement data acquisition step S1, the signal processing device 100 acquires i-th measurement data $D_i$ for each integer i of 1 or more and M or less. M is a predetermined integer of 2 or more. The i-th measurement data $D_i$ is data based on a signal output from an i-th sensor that detects a physical quantity generated due to the vibration of a target object, and may be time series data of a digital signal, which is output from the i-th sensor, or may be time series data of a digital signal in which an analog signal output from the i-th sensor is converted by the analog front end. In the measurement data acquisition step S1, the signal processing device 100 acquires the first to M-th measurement data $D_1$ to $D_M$ based on signals output from the first to M-th sensors.

The target object is an object that becomes a target of signal processing, and the type thereof is not particularly limited. For example, various devices such as a motor having a rotation mechanism or a vibration mechanism may be used, structures such as a bridge or a building that vibrates due to an external force may be used, or electric circuits that generate signals having a cyclic pattern may be used. The type of physical quantity generated due to the vibration of the target object is not particularly limited, and for example, the physical quantity may be acceleration, angular speed, speed, displacement, pressure, current, voltage, or the like.

The first to M-th sensors may be sensors that detect the same type of physical quantity. For example, for the X axis, Y axis, and Z axis that are orthogonal to each other, a first sensor may detect the acceleration in the X axis direction, a second sensor may detect the acceleration in the Y axis direction, and a third sensor may detect the acceleration in the Z axis direction. Alternatively, a part of the first to M-th sensors may be sensors that detect a physical quantity of a different type from the others. For example, the first sensor may detect the acceleration in the X axis direction, and the second sensor may detect the angular speed in the Y axis direction. The first to M-th sensors may be, for example, sensors using a micro electro mechanical systems (MEMS) vibrator or sensors using a quartz crystal vibrator. Further, the first to M-th sensors may be, for example, built in one device such as an inertial measurement unit (IMU), or at least one of the first to M-th sensors may be physically separated from the other sensors.

Next, in the measurement data division step S2, the signal processing device 100 generates N data sequences $D_{i-1}$ to $D_{i-N}$ by dividing the i-th measurement data $D_i$, which is acquired in the measurement data acquisition step S1, for each integer i of 1 or more and M or less. N is a predetermined integer of 2 or more. That is, in the measurement data division step S2, the signal processing device 100 generates N data sequences for each of the first to M-th measurement data $D_1$ to $D_M$. The detailed procedure of the measurement data division step S2 according to the first embodiment will be described later.

Next, in the averaged data sequence generation step S3, the signal processing device 100 generates the i-th averaged data sequence $D_{AVGi}$ obtained by averaging the N data sequences $D_{i-1}$ to $D_{i-N}$, which are generated by dividing the i-th measurement data $D_i$ for each integer i of 1 or more and M or less in the measurement data division step S2. Specifically, in the averaged data sequence generation step S3, the signal processing device 100 generates the i-th averaged data sequence $D_{AVGi}$ by converting time of each data with time of head data as common time for each of the N data sequences $D_{i-1}$ to $D_{i-N}$, for each integer i of 1 or more and M or less, and by averaging the N data sequences having the same time.

Next, in the Lissajous figure generation step S4, the signal processing device 100 generates a Lissajous figure in which the i-th averaged data sequence $D_{AVGi}$, which is generated in the averaged data sequence generation step S3, is assigned to an i-th axis for each integer i of 1 or more and M or less.

Next, in the display step S5, the signal processing device 100 displays the Lissajous figure generated in the Lissajous figure generation step S4 on a display portion. In the display step S5, the signal processing device 100 may display the N data sequences $D_{i-1}$ to $D_{i-N}$, which are generated by dividing the i-th measurement data $D_i$ for each integer i of 1 or more and M or less in the measurement data division step S2, and the Lissajous figure, which is generated in the Lissajous figure generation step S4, on the display portion.

Thereafter, the signal processing device 100 repeats steps S1 to S5 until the signal processing is ended (N in step S6).

Figure 2:
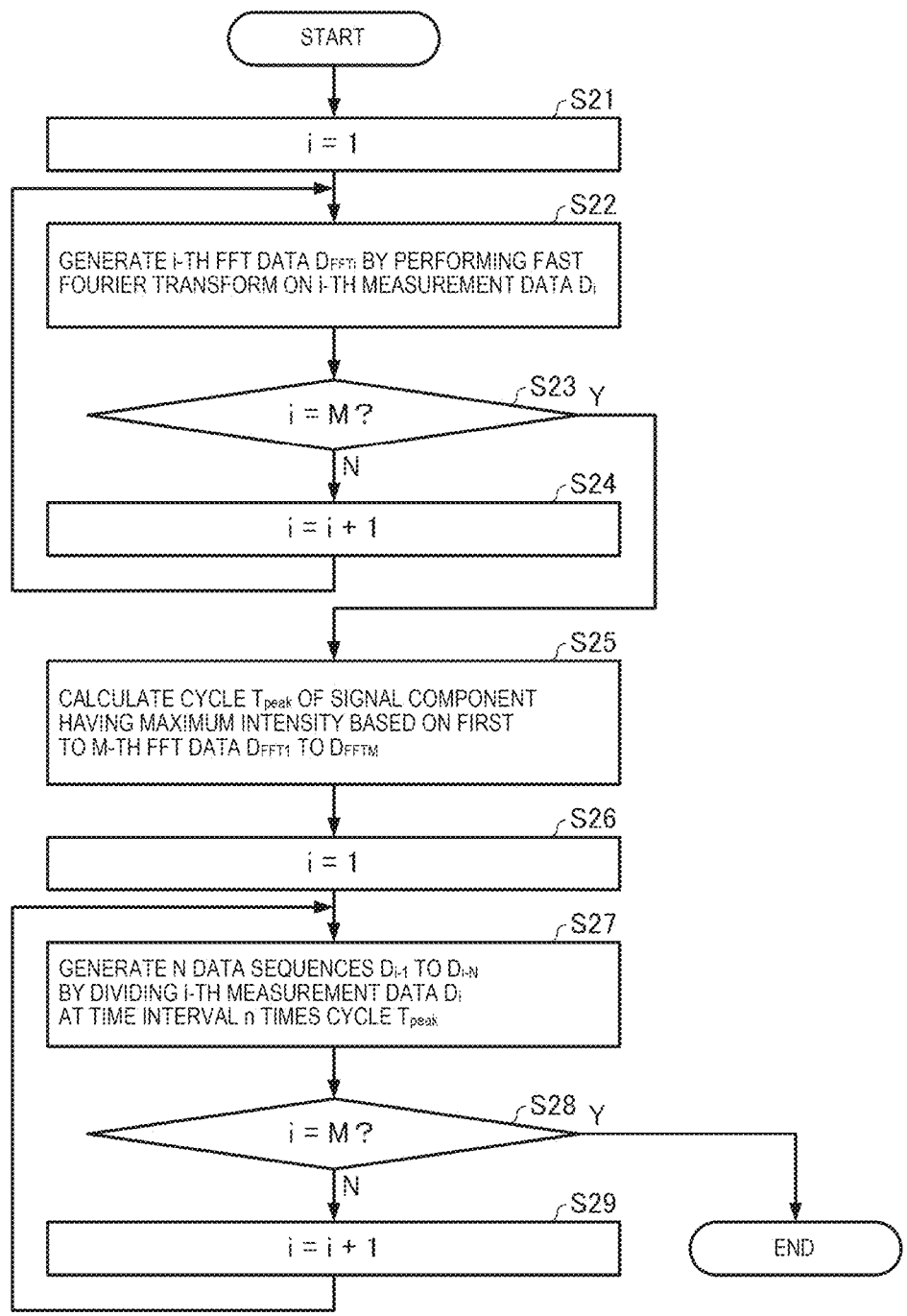
FIG. 2 is a flowchart illustrating an example of a procedure of a measurement data division step according to the first embodiment.

FIG. 2 is a flowchart illustrating an example of a procedure of the measurement data division step S2 in FIG. 1 according to the first embodiment.

As illustrated in FIG. 2, the signal processing device 100 first sets the integer i to 1 in step S21, and, in step S22, generates i-th FFT data $D_{FFTi}$ by performing a fast Fourier transform (FFT) on the i-th measurement data $D_i$ acquired in step S1 in FIG. 1.

Figure 3:
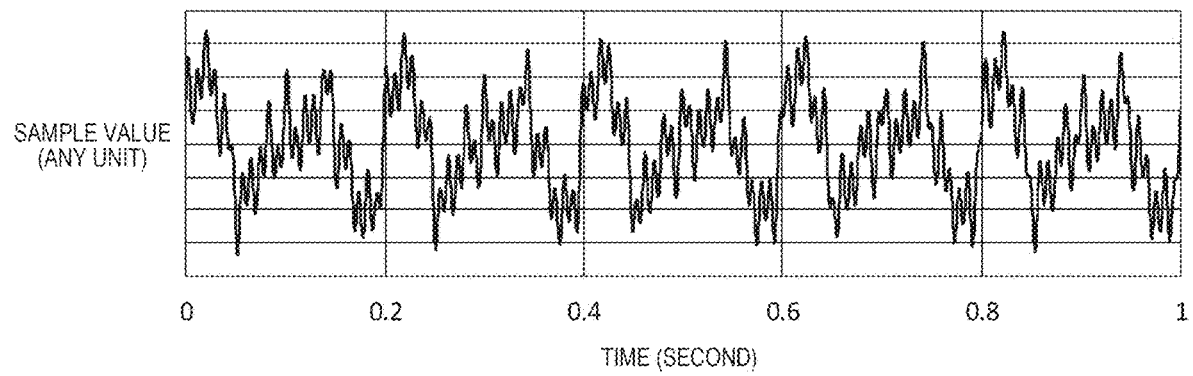
FIG. 3 is a diagram illustrating an example of i-th measurement data.
Figure 4:
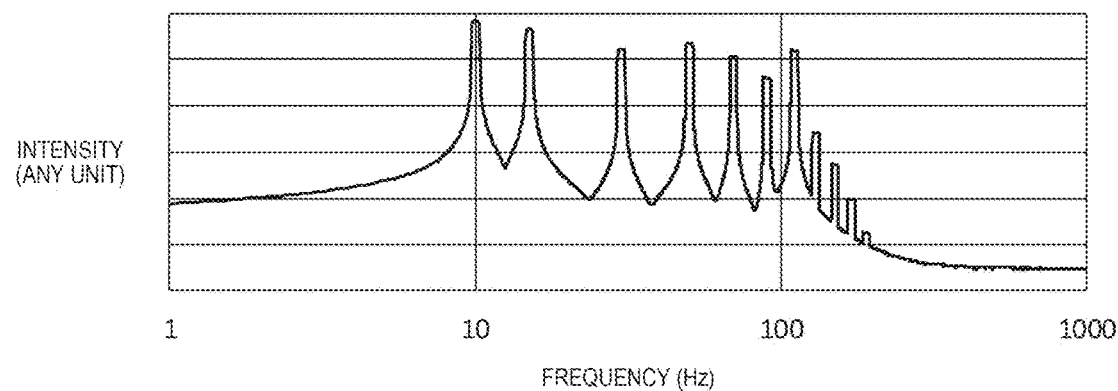
FIG. 4 is a diagram illustrating i-th FFT data.

FIG. 3 illustrates an example of the i-th measurement data $D_i$, and FIG. 4 illustrates the i-th FFT data $D_{FFTi}$ generated by performing a fast Fourier transform on the measurement data $D_i$ in FIG. 3. In FIG. 3, the horizontal axis indicates time and the vertical axis indicates a sample value. Further, in FIG. 4, the horizontal axis indicates a frequency and the vertical axis indicates an intensity. In the example in FIG. 3, the i-th measurement data $D_i$ is data for one second, and as illustrated in FIG. 4, the i-th measurement data $D_i$ includes a signal component of 10 Hz as a fundamental wave based on the vibration of the target object.

Thereafter, the signal processing device 100 repeats step S22 by increasing the integer i by 1 in step S24 until the integer i becomes M (N in step S23). That is, in the steps S22 to S24, the signal processing device 100 generates the first to M-th FFT data $D_{FFT1}$ to $D_{FFTM}$ by performing a fast Fourier transform on each of the first to M-th measurement data $D_1$ to $D_M$.

Next, when the integer i becomes M (Y in step S23), in step S25, the signal processing device 100 calculates a cycle $T_{peak}$ of the signal component having the maximum intensity based on the first to M-th FFT data $D_{FFT1}$ to $D_{FFTM}$. For example, in step S25, the signal processing device 100 may calculate the cycle $T_{peak}$ by adding the peak values of the intensities included in the first to M-th FFT data $D_{FFT1}$ to $D_{FFTM}$ for each frequency and calculating the reciprocal of the frequency at which the peak value after the addition becomes the maximum.

Next, the signal processing device 100 sets the integer i to 1 in step S26, and, in step S27, generates the N data sequences $D_{i-1}$ to $D_{i-N}$ by dividing the i-th measurement data $D_i$, which is acquired in step S1 in FIG. 1, at a time interval n times the cycle $T_{peak}$ calculated in step S25. n is an integer of 1 or more. That is, in step S27, the signal processing device 100 divides the i-th measurement data $D_i$, and generates the N data sequences $D_{i-1}$ to $D_{i-N}$ each having a time length n times the cycle $T_{peak}$. Note that, the time length of the i-th measurement data $D_i$ may be longer than n×N times the cycle $T_{peak}$.

Figure 5:
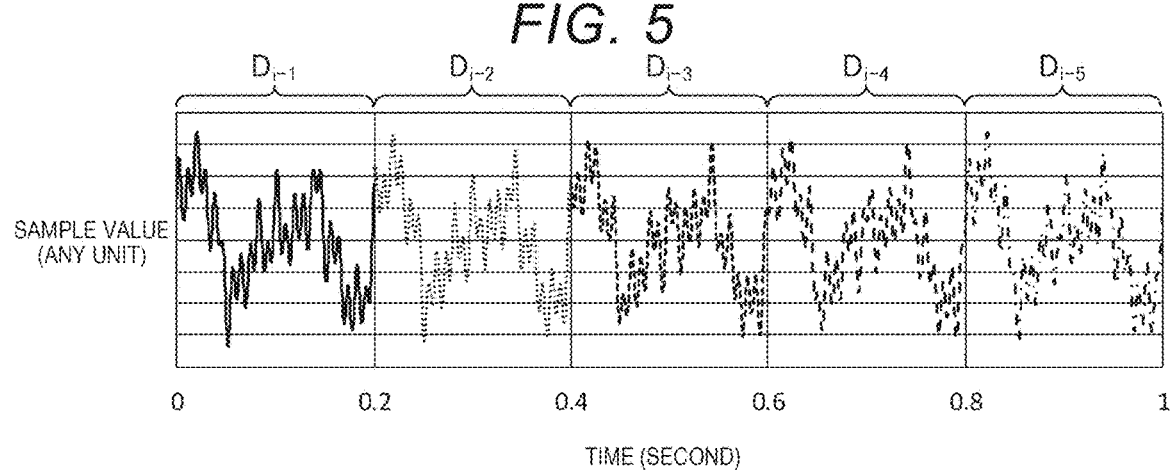
FIG. 5 is a diagram illustrating five data sequences generated by dividing the i-th measurement data.

FIG. 5 illustrates five data sequences $D_{i-1}$ to $D_{i-5}$ generated by dividing the i-th measurement data $D_i$ in FIG. 3. In FIG. 5, the horizontal axis indicates time and the vertical axis indicates a sample value. In FIG. 3, the intensity of the signal component of the 10 Hz fundamental wave is the maximum, and when the cycle $T_{peak}$ is defined as 0.1 seconds, in FIG. 5, five data sequences $D_{i-1}$ to $D_{i-5}$ are generated by setting the integer n to 2 and dividing the i-th measurement data $D_i$ at 0.2 seconds intervals.

Thereafter, the signal processing device 100 repeats step S27 by increasing the integer i by 1 in step S29 until the integer i becomes M (N in step S28), and when the integer i becomes M (Y in step S28), the measurement data division step S2 is ended. That is, in steps S27 to S29, the signal processing device 100 generates the N data sequences $D_{i-1}$ to $D_{i-N}$ for each of the first to M-th measurement data $D_1$ to $D_M$.

The signal processing device 100 generates the i-th averaged data sequence $D_{AVGi}$ by averaging the N data sequences $D_{i-1}$ to $D_{i-N}$ generated in this manner for each integer i of 1 or more and M or less.

Figure 6:
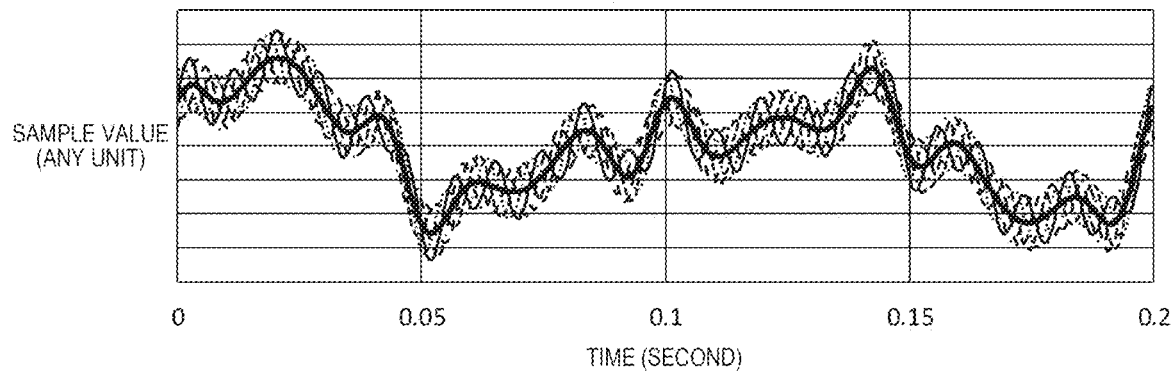
FIG. 6 is a diagram illustrating i-th averaged data sequence obtained by averaging the five data sequences in FIG. 5.

In FIG. 6, the i-th averaged data sequence $D_{AVGi}$ obtained by averaging the data sequences $D_{i-1}$ to $D_{i-5}$ in FIG. 5 is illustrated by a thick solid line. In FIG. 6, the horizontal axis indicates time and the vertical axis indicates a sample value. Note that FIG. 6 also illustrates the data sequences $D_{i-1}$ to $D_{i-5}$. A sample value at time t of the i-th averaged data sequence $D_{AVGi}$ is an average value of a sample value at time t of the data sequence $D_{i-1}$, a sample value at time t−0.2 seconds of the data sequence $D_{i-2}$, a sample value at time t−0.4 seconds of the data sequence $D_{i-3}$, a sample value at time t−0.6 seconds of the data sequence $D_{i-4}$, and a sample value at time t−0.8 seconds of the data sequence $D_{i-5}$.

The signal processing device 100 generates a Lissajous figure in which the i-th averaged data sequence $D_{AVGi}$ is assigned to the i-th axis for each integer i of 1 or more and M or less. As described above, in the present embodiment, the signal processing device 100 generates the Lissajous figure in which the i-th averaged data sequence $D_{AVGi}$ is assigned to the i-th axis instead of the i-th measurement data $D_i$. The signal component, which is based on the vibration of the target object included in the i-th measurement data $D_i$, is also included in the i-th averaged data sequence $D_{AVGi}$, but the noise component that is included in the i-th measurement data $D_i$ is greatly reduced by using the averaging. Therefore, according to the signal processing method of the present embodiment, a stable Lissajous figure with reduced fluctuation can be obtained.

Figure 7:
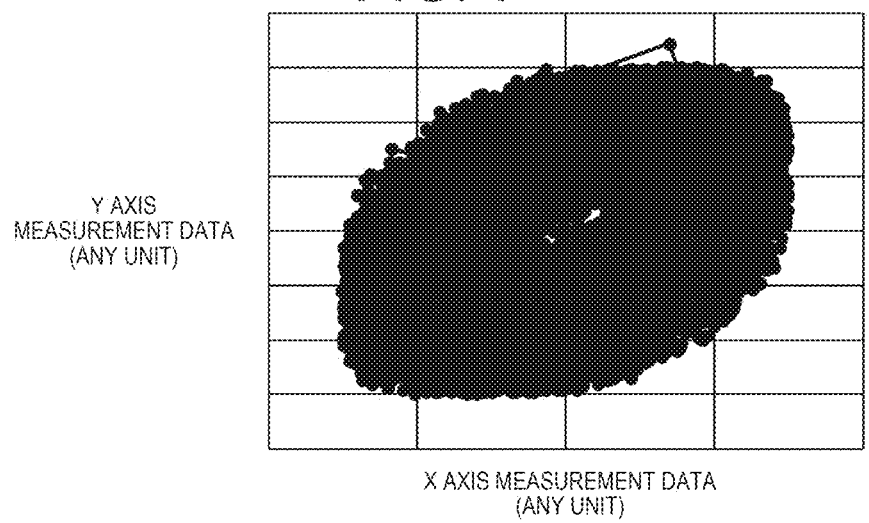
FIG. 7 is a diagram illustrating an example of a Lissajous figure of a comparative example.
Figure 8:
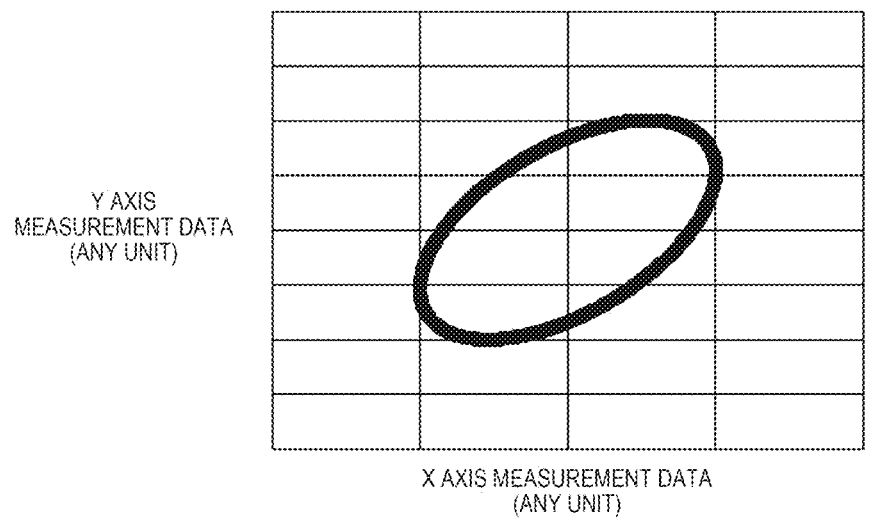
FIG. 8 is a diagram illustrating an example of a Lissajous figure of the present embodiment.

FIG. 7 illustrates an example of a Lissajous figure of a comparative example generated by tentatively assigning the first measurement data $D_1$ to the X axis and assigning the second measurement data $D_2$ to the Y axis. Further, FIG. 8 illustrates an example of the Lissajous figure of the present embodiment that is generated by assigning the first averaged data sequence $D_{AVG1}$ to the X axis and assigning the second averaged data sequence $D_{AVG2}$ to the Y axis. The Lissajous figure of the comparative example illustrated in FIG. 7 has a large fluctuation and is unstable, but the Lissajous figure of the present embodiment illustrated in FIG. 8 has a small fluctuation and stable elliptical shape. Therefore, a user can more accurately estimate the change in the state of the target object by monitoring the time change of the Lissajous figure generated by the signal processing method of the present embodiment.

Figure 9:
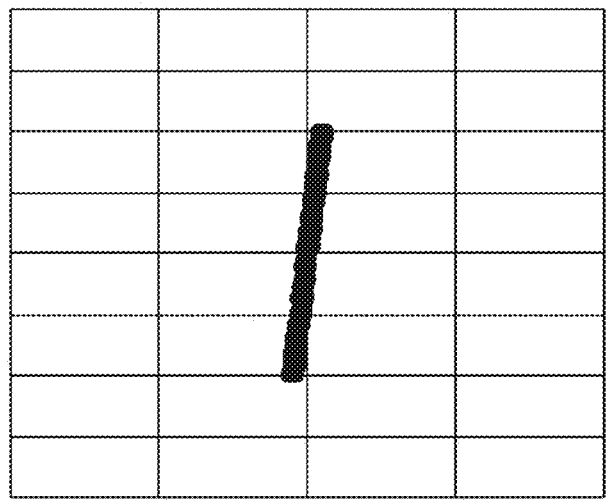
FIG. 9 is a diagram illustrating an example of a Lissajous figure generated when a signal component having a fundamental wave is not included in N data sequences.
Figure 10:
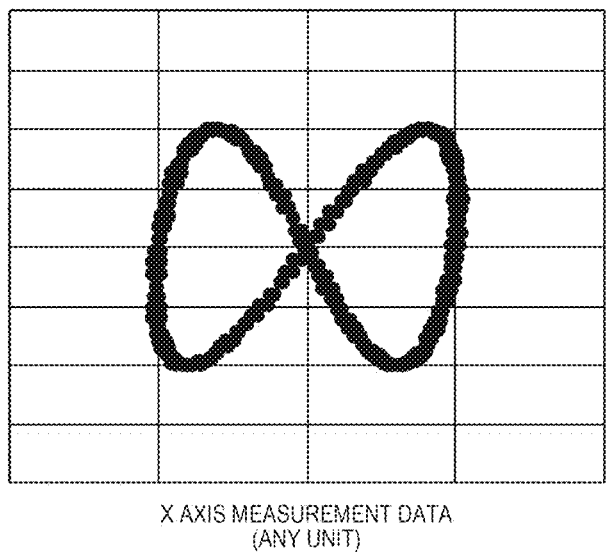
FIG. 10 is a diagram illustrating an example of a Lissajous figure generated when a signal component having a fundamental wave is included in the N data sequences.

In the i-th measurement data $D_i$, when the intensity of a second-order harmonic of the fundamental wave based on the vibration of the target object is the maximum, since the i-th measurement data $D_i$ is divided at a time interval n times the cycle of the second-order harmonic when the integer n is tentatively defined as 1, the N data sequences $D_{i-1}$ to $D_{i-N}$ do not include the signal component of the fundamental wave. Therefore, even when the intensity of the second-order harmonic is the maximum, the signal component of the fundamental wave is not included in the N data sequences $D_{i-1}$ to $D_{i-N}$. Therefore, even when the intensity of the second-order harmonic is the maximum, the integer n is preferably 2 or more so that the signal component of the fundamental wave is included in the N data sequences $D_{i-1}$ to $D_{i-N}$. As a specific example, for example, a signal component of 20 Hz, which is the fundamental wave, and each signal component of the harmonic are included in the first measurement data $D_1$ and the second measurement data $D_2$, and it is assumed that the intensity of the signal component of the second-order harmonic of 40 Hz is the maximum. In this case, when the integer n is defined as 1, since the signal component of 20 Hz, which is the fundamental wave, is not included in the N data sequences $D_{1-1}$ to $D_{1-N}$ and the N data sequences $D_{2-1}$ to $D_{2-N}$, the Lissajous figure as illustrated in FIG. 9 is generated. In contrast to this, when the integer n is defined as 2 or more, since the signal component of 20 Hz, which is the fundamental wave, is included in the N data sequences $D_{1-1}$ to $D_{1-N}$ and the N data sequences $D_{2-1}$ to $D_{2-N}$, the Lissajous figure as illustrated in FIG. 10 is generated.

Figure 11:
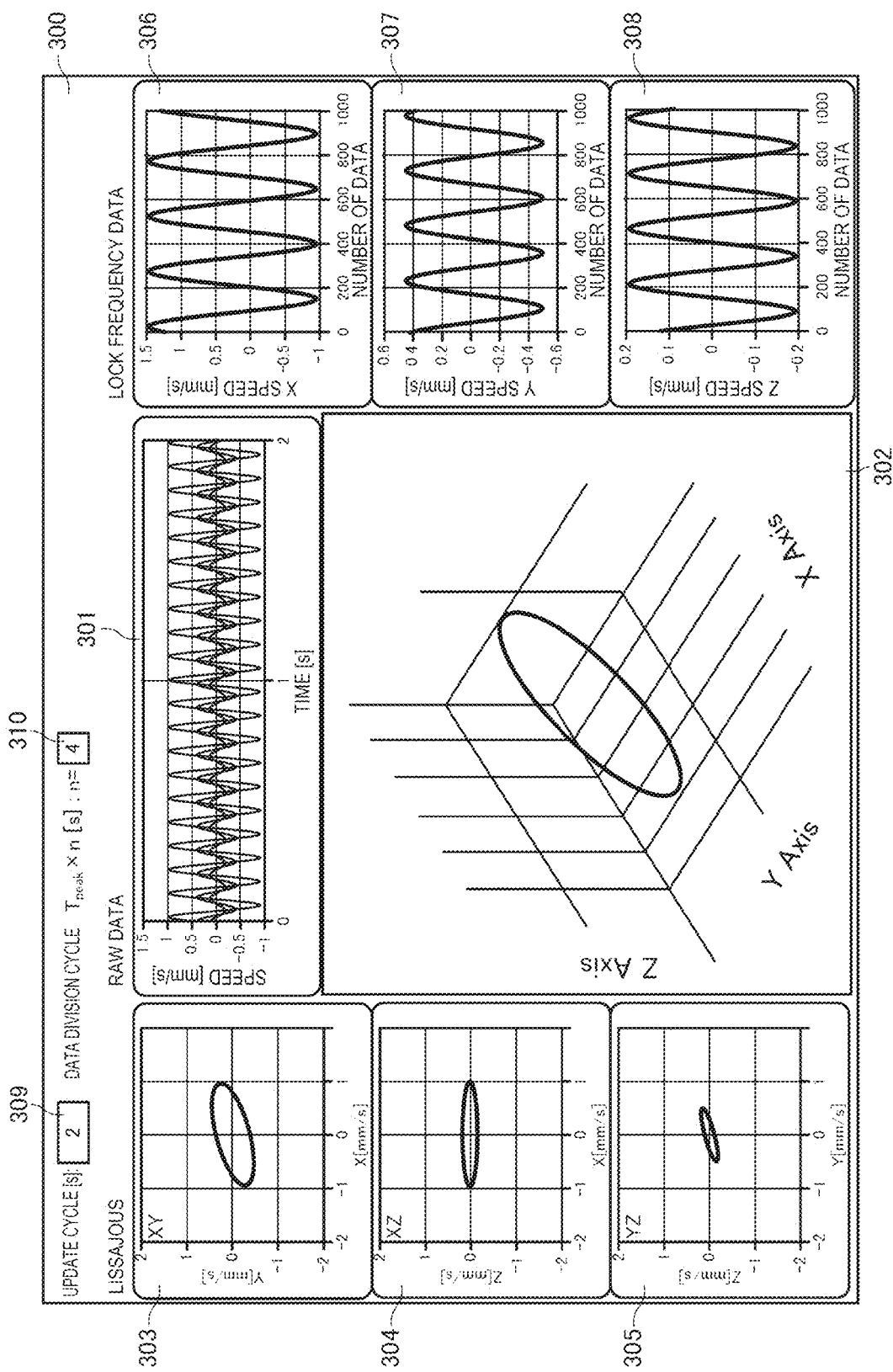
FIG. 11 is a diagram illustrating an example of a screen displayed on a display portion.

The signal processing device 100 may generate the Lissajous figure in real time by acquiring the first to M-th measurement data $D_1$ to $D_M$ each time a signal is output from the first to M-th sensors. FIG. 11 is a diagram illustrating an example of a screen displayed in real time on the display portion in the display step S5 in FIG. 1 in this case.

A screen 300 illustrated in FIG. 11 includes a first display image 301, a second display image 302, a third display image 303, a fourth display image 304, a fifth display image 305, a sixth display image 306, a seventh display image 307, an eighth display image 308, a first input portion 309, and a second input portion 310.

In the first input portion 309, an update cycle in which the first display image 301 to the eighth display image 308 are updated is input by a user. On the screen 300 illustrated in FIG. 11, 2 seconds is input as the update cycle. The signal processing device 100 newly performs steps S1 to S5 in FIG. 1 every time the update cycle, which is input to the first input portion 309, elapses.

An integer n of a data division cycle $T_{peak} \times n$, which is a time interval in which the signal processing device 100 divides the first to M-th measurement data $D_1$ to $D_M$ in step S27 in FIG. 2, is input to the second input portion 310 by the user. On the screen 300 illustrated in FIG. 11, 4 is input as the integer n.

The first display image 301 is an image in which the X axis speed data that is the first measurement data $D_1$, the Y axis speed data that is the second measurement data $D_2$, and the Z axis speed data that is the third measurement data $D_3$ are superimposed and displayed. The time lengths of the X axis speed data, the Y axis speed data, and the Z axis speed data included in the first display image 301 match the update cycle input to the first input portion 309.

The second display image 302 is an image of a three-dimensional Lissajous figure in which a first averaged data sequence $D_{AVG1}$, which is generated based on the X axis speed data, is assigned to the X axis that is a first axis, a second averaged data sequence $D_{AVG2}$, which is generated based on the Y axis speed data, is assigned to the Y axis that is a second axis, and a third averaged data sequence $D_{AVG3}$, which is generated based on the Z axis speed data, is assigned to the Z axis that is a third axis. This Lissajous figure is generated based on the time lengths of the X axis speed data, the Y axis speed data, and the Z axis speed data input to the first input portion 309, that is, the X axis speed data, the Y axis speed data, and the Z axis speed data included in the first display image 301.

The third display image 303 is an image of a two-dimensional Lissajous figure obtained by projecting the Lissajous figure of the second display image 302 onto the XY plane.

The fourth display image 304 is an image of a two-dimensional Lissajous figure obtained by projecting the Lissajous figure of the second display image 302 onto the XZ plane.

The fifth display image 305 is an image of a two-dimensional Lissajous figure obtained by projecting the Lissajous figure of the second display image 302 onto the YZ plane.

The sixth display image 306 is an image in which the X axis lock frequency data, which is the N data sequences $D_{1-1}$ to $D_{1-N}$ generated by dividing the X axis speed data that is the first measurement data $D_1$ included in the first display image 301, is superimposed and displayed.

The seventh display image 307 is an image in which the Y axis lock frequency data, which is the N data sequences $D_{2-1}$ to $D_{2-N}$ generated by dividing the Y axis speed data that is the second measurement data $D_2$ included in the first display image 301, is superimposed and displayed.

The eighth display image 308 is an image in which the Z axis lock frequency data, which is the N data sequences $D_{3-1}$ to $D_{3-N}$ generated by dividing the Z axis speed data that is the third measurement data $D_3$ included in the first display image 301, is superimposed and displayed.

On the screen 300 illustrated in FIG. 11, each of the N data sequences $D_{1-1}$ to $D_{1-N}$ included in the X axis lock frequency data, the N data sequences $D_{2-1}$ to $D_{2-N}$ included in the Y axis lock frequency data, and the N data sequences $D_{3-1}$ to $D_{3-N}$ included in the Z axis lock frequency data, has 1000 data. Note that, the integer N is, for example, a quotient when the update cycle, which is input to the first input portion 309, is divided by the data division cycle, which is calculated by the product of the integer n, which is input to the second input portion 310, and the cycle $T_{peak}$. For example, since the update cycle is 2 seconds and the integer n is 4 when the cycle $T_{peak}$ is 0.1 seconds, which is the cycle of the fundamental wave, the integer N is 5.

On the screen 300 illustrated in FIG. 11, the variation of the X axis lock frequency data, the Y axis lock frequency data, and the Z axis lock frequency data included in the sixth display image 306, the seventh display image 307, and the eighth display image 308, respectively, is small. This is because the X axis lock frequency data, the Y axis lock frequency data, and the Z axis lock frequency data include the signal component of the fundamental wave based on the vibration of the target object, in other words, the data division cycle is equal to or longer than the cycle of the fundamental wave. In other words, when the data division cycle is shorter than the cycle of the fundamental wave, the variations of the X axis lock frequency data, the Y axis lock frequency data, and the Z axis lock frequency data become large, and since the X axis lock frequency data, the Y axis lock frequency data, and the Z axis lock frequency data do not include the signal component of the fundamental wave, the Lissajous figure of the first display image 301 does not properly represent the state of the target object. Therefore, in a case where the variations of the X axis lock frequency data, the Y axis lock frequency data, and the Z axis lock frequency data are large when the user visually observes the sixth display image 306, the seventh display image 307, and the eighth display image 308, the user needs to analyze the Lissajous figure in a state where the variations of the X axis lock frequency data, the Y axis lock frequency data, and the Z axis lock frequency data are reduced by increasing the integer n input to the second input portion 310.

The user can check the vibration status of the target object in real time on the screen 300 illustrated in FIG. 11. Therefore, the user can efficiently grasp or analyze the information and detect the abnormality of the target object at an early stage.

Figure 12:
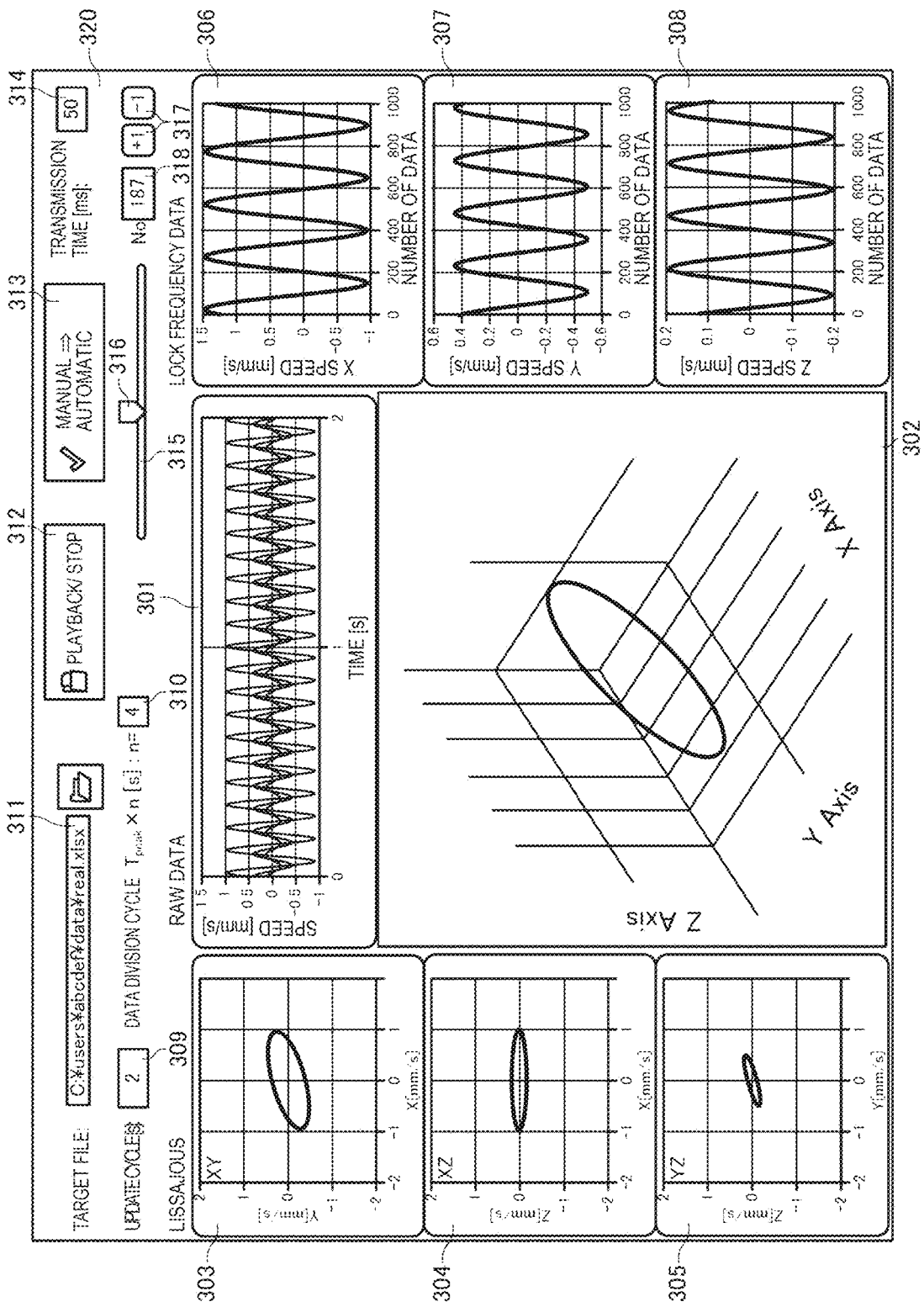
FIG. 12 is a diagram illustrating an example of a screen displayed on the display portion.

The screen 300 illustrated in FIG. 11 is obtained by the signal processing device 100 generating the Lissajous figure in real time. In contrast to this, the signal processing device 100 may acquire the first to M-th measurement data $D_1$ to $D_M$ stored in the storage medium and playback the Lissajous figure. FIG. 12 is a diagram illustrating an example of a screen displayed on the display portion in the display step S5 in FIG. 1 in this case. Similar to the screen 300 illustrated in FIG. 11, a screen 320 illustrated in FIG. 12 includes a first display image 301, a second display image 302, a third display image 303, a fourth display image 304, a fifth display image 305, a sixth display image 306, a seventh display image 307, an eighth display image 308, a first input portion 309, and a second input portion 310. Further, the screen 320 illustrated in FIG. 12 includes a file designation portion 311, a playback button 312, a mode switch button 313, a third input portion 314, a time input portions 315, 316, or 317, and a frame number display portion 318.

The user designates an excel file, which is a target of data playback, in a file designation portion 311. The Excel file includes the first to M-th measurement data $D_1$ to $D_M$ acquired in advance.

The user can select either manual playback or automatic playback by pressing the mode switch button 313. When the user selects the automatic playback and presses the playback button 312, the first display image 301 to the eighth display image 308 are sequentially updated in the update cycle input to the first input portion 309. That is, the signal processing device 100 newly performs steps S1 to S5 in FIG. 1 every time the update cycle, which is input to the first input portion 309, elapses.

When the automatic playback is selected, the user can set the speed, at which the first display image 301 to the eighth display image 308 are updated, to any speed by inputting any numerical value in the third input portion 314. In the real-time screen 300 illustrated in FIG. 11, the first display image 301 to the eighth display image 308 are updated every two seconds, whereas in the data playback screen 320 illustrated in FIG. 12, since 50 milliseconds are set in the third input portion 314, the first display image 301 to the eighth display image 308 are updated every 50 milliseconds. Note that, the processing for the first to M-th measurement data $D_i$ to $D_M$ included in the excel file is performed in the update cycle designated by the first input portion 309 regardless of the value designated by the third input portion 314. As a result, on the data playback screen 320 illustrated in FIG. 12, the first display image 301 to the eighth display image 308 similar to the real-time screen 300 illustrated in FIG. 11 are played back at any speed.

The frame number display portion 318 displays the frame numbers of the first display image 301 to the eighth display image 308 to be displayed. For example, the frame numbers of the first display image 301 to the eighth display image 308 to be displayed are 1, and the frame numbers of the first display image 301 to the eighth display image 308 to be displayed at the k-th position are k. On the real-time screen 320 illustrated in FIG. 12, the 187th first display image 301 to the eighth display image 308 are displayed.

When the user presses the playback button 312 during the automatic playback, the automatic playback is stopped. Further, when the user presses the mode switch button 313 during the automatic playback or designates a predetermined time in the time input portions 315, 316, or 317, the automatic playback is stopped and the playback is switched to the manual playback. The time input portion 315 is a seek bar, and the time input portion 316 is a knob of the seek bar. Further, the time input portion 317 is an increment/decrement button. When designating a predetermined time through the time input portions 315, 316, or 317, the user moves the time input portion 316 or increases/decreases the numerical value displayed on the frame number display portion 318 by using the time input portion 317. The position of the time input portion 316 and the value of the frame number display portion 318 are linked, and when one is changed, the other is automatically changed.

Since the user can playback the data at any speed by using the data playback screen 320 illustrated in FIG. 12, the status of the vibration of the target object can be checked in a short time. Therefore, the user can improve the work efficiency and efficiently grasp or analyze the information.

1-1-2. Signal Processing Device

Figure 13:
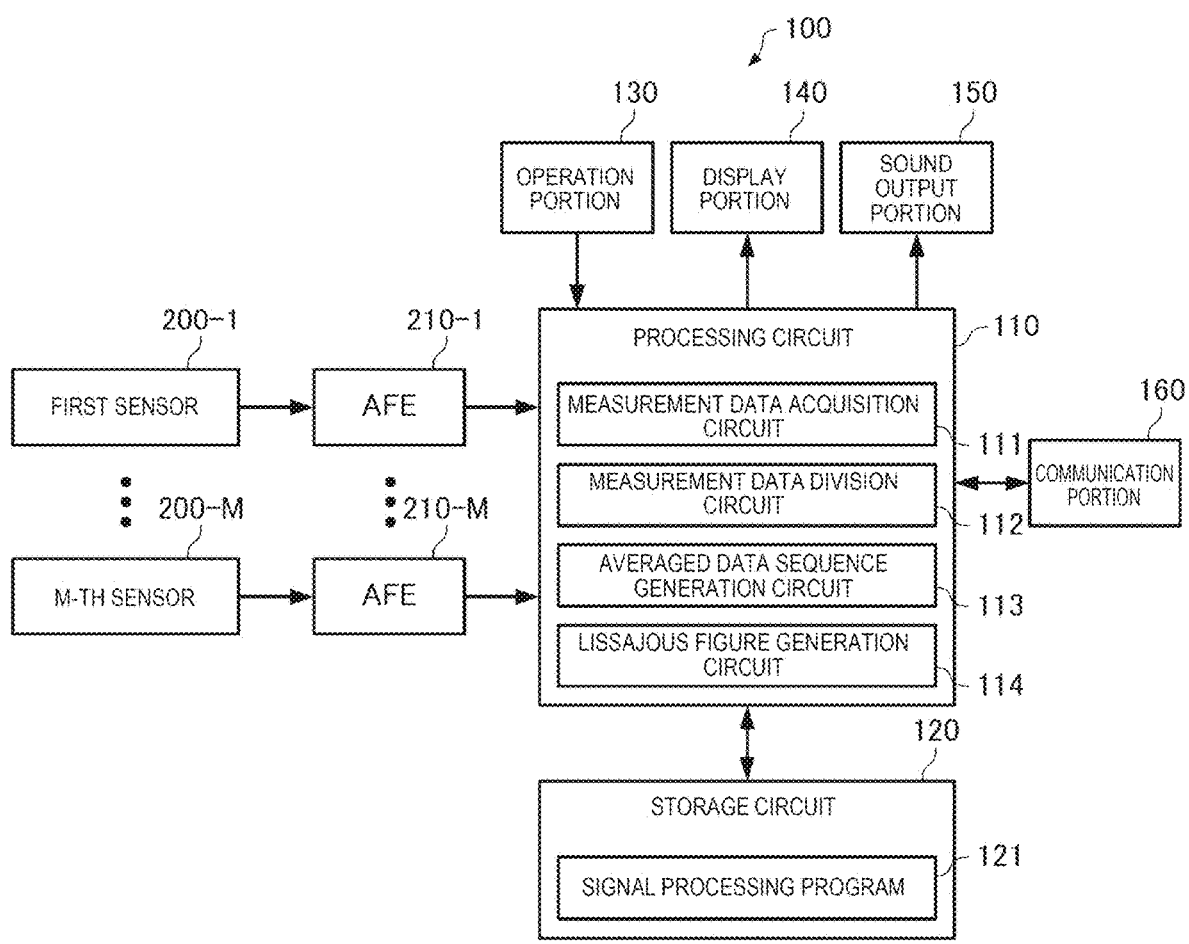
FIG. 13 is a diagram illustrating an example of a configuration of a signal processing device that executes a signal processing method of the first embodiment.

FIG. 13 is a diagram illustrating an example of a configuration of the signal processing device 100 that executes the signal processing method of the first embodiment. As illustrated in FIG. 13, the signal processing device 100 includes the first to M-th sensors 200-1 to 200-M, M analog front ends (AFE) 210-1 to 210-M, a processing circuit 110, a storage circuit 120, an operation portion 130, the display portion 140, a sound output portion 150, and a communication portion 160. Note that, the signal processing device 100 may have a configuration in which some of the components in FIG. 13 are omitted or changed, or other components are added. For example, the first to M-th sensors 200-1 to 200-M or the analog front ends 210-1 to 210-M do not have to be components of the signal processing device 100.

Each of the first to M-th sensors 200-1 to 200-M detects a physical quantity generated due to the vibration of the target object and outputs a signal having a magnitude corresponding to the detected physical quantity. Each of the output signals of the first to M-th sensors 200-1 to 200-M is input to each of the analog front ends 210-1 to 210-M.

Each of the analog front ends 210-1 to 210-M performs amplification processing, A/D conversion processing, or the like with respect to each of the output signals of the first to M-th sensors 200-1 to 200-M and outputs a digital time series signal.

The processing circuit 110 performs the signal processing by acquiring the M digital time series signals, which are output from the analog front ends 210-1 to 210-M, as the first to M-th measurement data $D_1$ to $D_M$. Specifically, the processing circuit 110 executes a signal processing program 121 stored in the storage circuit 120 and performs various calculation processing with respect to the first to M-th measurement data $D_1$ to $D_M$. In addition, the processing circuit 110 performs various processing according to an operation signal from the operation portion 130, processing of transmitting a display signal for displaying various information on the display portion 140, processing of transmitting a sound signal for causing the sound output portion 150 to generate various sounds, processing of controlling the communication portion 160 to perform data communication with an external device (not illustrated), or the like. The processing circuit 110 is realized by, for example, a central processing unit (CPU) or a digital signal processor (DSP).

By executing the signal processing program 121, the processing circuit 110 functions as a measurement data acquisition circuit 111, a measurement data division circuit 112, an averaged data sequence generation circuit 113, and a Lissajous figure generation circuit 114. That is, the signal processing device 100 includes the measurement data acquisition circuit 111, the measurement data division circuit 112, the averaged data sequence generation circuit 113, and the Lissajous figure generation circuit 114.

The measurement data acquisition circuit 111 acquires the i-th measurement data $D_i$ based on the signal output from the i-th sensor 200-$i$ that detects the physical quantity generated due to the vibration of the target object, for each integer i of 1 or more and M or less. That is, the measurement data acquisition circuit 111 executes the measurement data acquisition step S1 in FIG. 1. The i-th measurement data $D_i$ acquired by the measurement data acquisition circuit 111 is stored in the storage circuit 120.

The measurement data division circuit 112 generates the N data sequences $D_{i-1}$ to $D_{i-N}$ by dividing the i-th measurement data $D_i$ for each integer i of 1 or more and M or less. Specifically, the measurement data division circuit 112 generates the i-th FFT data $D_{FFTi}$ by performing a fast Fourier transform on the i-th measurement data $D_i$ for each integer i of 1 or more and M or less, calculates the cycle of the signal component having the maximum intensity based on the first to M-th FFT data $D_{FFT1}$ to $D_{FFTM}$, and generates the N data sequences to $D_{i-N}$ by dividing the i-th measurement data $D_i$ at a time interval n times the cycle for each integer i of 1 or more and M or less. That is, the measurement data division circuit 112 executes the measurement data division step S2 in FIG. 1, specifically, steps S21 to S29 in FIG. 2. The N data sequences $D_{i-1}$ to $D_{i-N}$ generated by dividing the i-th measurement data $D_i$ by the measurement data division circuit 112 are stored in the storage circuit 120.

The averaged data sequence generation circuit 113 generates the i-th averaged data sequence $D_{AVGi}$ by averaging the N data sequences $D_{i-1}$ to $D_{i-N}$ generated by dividing the i-th measurement data $D_i$ for each integer i of 1 or more and M or less. That is, the averaged data sequence generation circuit 113 executes the averaged data sequence generation step S3 in FIG. 1. The i-th averaged data sequence $D_{AVGi}$ generated by the averaged data sequence generation circuit 113 is stored in the storage circuit 120.

The Lissajous figure generation circuit 114 generates a Lissajous figure in which the i-th averaged data sequence $D_{AVGi}$ is assigned to the i-th axis for each integer i of 1 or more and M or less. That is, the Lissajous figure generation circuit 114 executes the Lissajous figure generation step S4 in FIG. 1. The Lissajous figure generated by the Lissajous figure generation circuit 114 is stored in the storage circuit 120.

The storage circuit 120 has a read only memory (ROM) and a random access memory (RAM) (not illustrated). The ROM stores various programs such as the signal processing program 121 or predetermined data, and the RAM stores the data generated by the processing circuit 110. The RAM is also used as a work region of the processing circuit 110 and stores a program or data read from the ROM, data input from the operation portion 130, and data temporarily generated by the processing circuit 110.

The operation portion 130 is an input device configured with operation keys, button switches, and the like, and outputs an operation signal according to a user's operation to the processing circuit 110.

The display portion 140 is a display device configured with a liquid crystal display (LCD) and the like, and displays various pieces of information based on the display signals output from the processing circuit 110. A touch panel functioning as the operation portion 130 may be provided in the display portion 140. For example, the display portion 140 may display the screen 300 illustrated in FIG. 11 or the screen 320 illustrated in FIG. 12 including the Lissajous figure based on the display signal output from the processing circuit 110.

The sound output portion 150 is constituted by a speaker or the like and generates various sounds based on the sound signal output from the processing circuit 110. For example, the sound output portion 150 may generate a sound indicating the start or end of signal processing based on the sound signal output from the processing circuit 110.

The communication portion 160 performs various controls for establishing data communication between the processing circuit 110 and the external device. For example, the communication portion 160 may transmit the information about a Lissajous figure to the external device, and the external device may display the received Lissajous figure on the display portion (not illustrated).

At least a part of the measurement data acquisition circuit 111, the measurement data division circuit 112, the averaged data sequence generation circuit 113, and the Lissajous figure generation circuit 114 may be realized by dedicated hardware. Further, the signal processing device 100 may be a single device or may be configured with a plurality of devices. For example, the first to M-th sensors 200-1 to 200-M and the analog front ends 210-1 to 210-M may be included in a first device, and the processing circuit 110, the storage circuit 120, the operation portion 130, the display portion 140, the sound output portion 150, and the communication portion 160 may be included in a second device which is separated from the first device. Further, for example, the processing circuit 110 and the storage circuit 120 are realized by a device such as a cloud server, the Lissajous figure is generated by the device, and the generated Lissajous figure may be transmitted to a terminal including an operation portion 130, a display portion 140, a sound output portion 150, and a communication portion 160 via a communication line.

1-1-3. Action Effect

In the signal processing method of the first embodiment described above, the signal processing device 100 generates the N data sequences $D_{i-1}$ to $D_{i-N}$ by dividing the i-th measurement data $D_i$ based on the signal output from the i-th sensor 200-$i$ that detects the physical quantity generated due to the vibration of the target object for each integer i of 1 or more and M or less, generates the i-th averaged data sequence $D_{AVGi}$ by averaging the N data sequences $D_{i-1}$ to $D_{i-N}$, and generates the Lissajous figure in which the i-th averaged data sequence $D_{AVGi}$ is assigned to the i-th axis. That is, the signal processing device 100 does not generate the Lissajous figure by assigning the i-th measurement data $D_i$ to the i-th axis as it is but generates the Lissajous figure by assigning the i-th averaged data sequence $D_{AVGi}$ obtained by averaging the N data sequences $D_{i-1}$ to $D_{i-N}$, which is generated by dividing the i-th measurement data $D_i$, to the i-th axis. Therefore, according to the signal processing method of the first embodiment, by using the averaging, the high frequency or low frequency noise components included in the i-th measurement data $D_i$ are reduced, and the signal components based on the vibration of the target object are emphasized so that a stable Lissajous figure with reduced fluctuation can be obtained. Since the signal component based on the vibration of the target object is likely to be affected by the characteristics or changes in a state of the target object, the user can correctly recognize the characteristics or changes in the state of the target object based on the Lissajous figure.

Further, in the signal processing method of the first embodiment, the signal processing device 100 generates the i-th FFT data $D_{FFTi}$ by performing a fast Fourier transform on the i-th measurement data $D_i$ for each integer i of 1 or more and M or less, calculates the cycle of the signal component having the maximum intensity based on the first to M-th FFT data $D_{FFT1}$ to $D_{FFTM}$, and generates the N data sequences $D_{i-1}$ to $D_{i-N}$ by dividing the i-th measurement data $D_i$ at a time interval n times the cycle for each integer i of 1 or more and M or less. Further, the signal processing device 100 generates the i-th averaged data sequence $D_{AVGi}$ by converting time of each data with time of head data as common time for each of the N data sequences $D_{i-1}$ to $D_{i-N}$, which are generated by dividing the i-th measurement data $D_i$ for each integer i of 1 or more and M or less, and averaging the N data sequences having the same time. Therefore, according to the signal processing method of the first embodiment, the signal components having the maximum intensity are synchronized and averaged, so that the Lissajous figure in which the characteristics of the signal components are emphasized can be obtained. Further, since the signal components having the maximum intensity are synchronized by averaging the head N data sequences in order, the processing load required for synchronization is reduced.

Further, by defining the integer n as 2 or more, even when the intensity of the second-order harmonic with respect to the fundamental wave of the vibration of the target object is the maximum in the i-th measurement data $D_i$ for each integer i of 1 or more and M or less, the N data sequences $D_{i-1}$ to $D_{i-N}$, which are generated by dividing the i-th measurement data $D_i$, include the signal components of the fundamental wave. Therefore, according to the signal processing method of the first embodiment, a Lissajous figure having the characteristics of the signal component of the fundamental wave can be obtained.

Further, in the signal processing method of the first embodiment, as illustrated in FIG. 9 or FIG. 10, the N data sequences $D_{i-1}$ to $D_{i-N}$, generated by dividing the i-th measurement data $D_i$ for each integer i of 1 or more and M or less, and the Lissajous figure are displayed on the display portion. Therefore, according to the signal processing method of the first embodiment, when the variations of the N data sequences $D_{i-1}$ to $D_{i-N}$ displayed on the display portion are small, the user can determine that the Lissajous figure having the characteristics of the fundamental wave of the vibration of the target object is obtained, and can correctly recognize the state of the target object based on the Lissajous figure.

1-2. Second Embodiment

Hereinafter, with regard to a second embodiment, the same components as those of the first embodiment are given the same reference numerals, the description overlapping with the first embodiment is omitted or simplified, and the contents different from the first embodiment will be mainly described.

Figure 14:
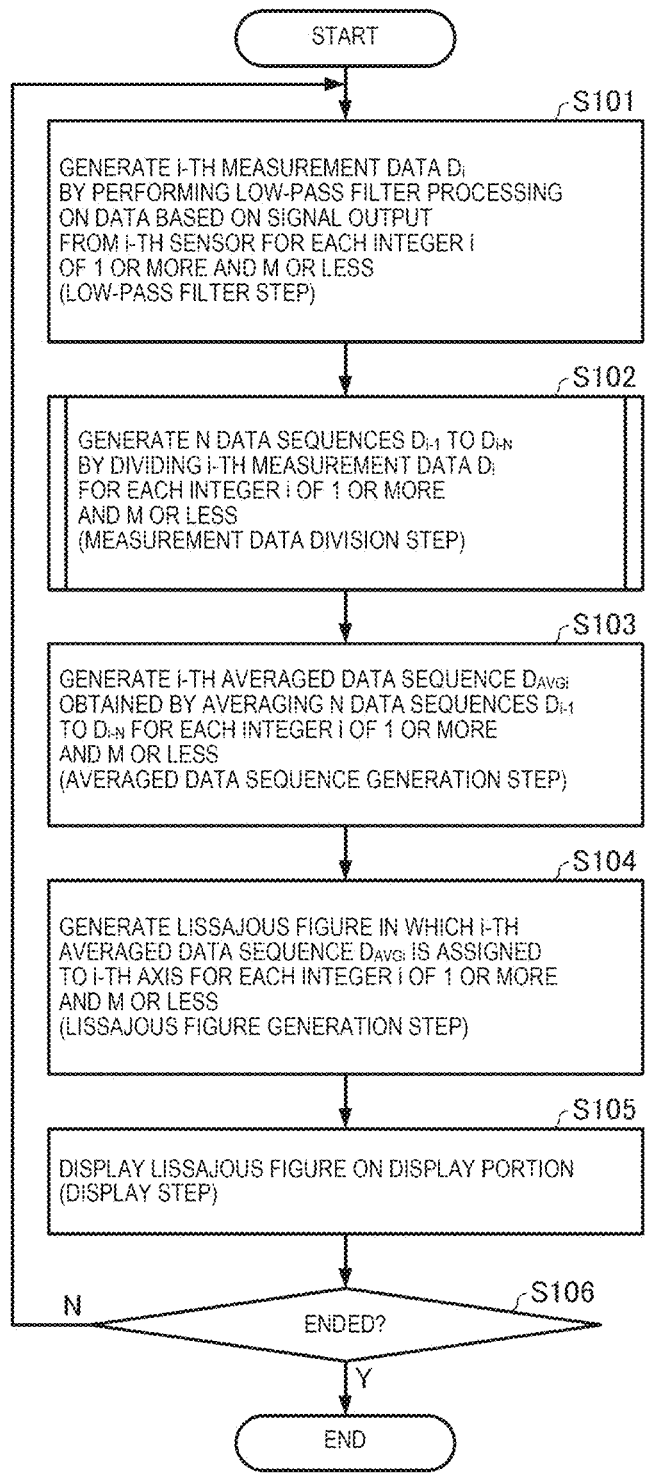
FIG. 14 is a flowchart illustrating a procedure of a signal processing method of a second embodiment.

FIG. 14 is a flowchart illustrating a procedure of a signal processing method of the second embodiment. As illustrated in FIG. 14, the signal processing method of the second embodiment includes a low-pass filter step S101, a measurement data division step S102, an averaged data sequence generation step S103, a Lissajous figure generation step S104, and a display step S105. Note that, in the signal processing method of the second embodiment, some of these steps may be omitted or changed, or other steps may be added. The signal processing method of the second embodiment is executed by, for example, a signal processing device 100. An example of a configuration of the signal processing device 100 that executes the signal processing method of the second embodiment will be described later.

As illustrated in FIG. 14, first, in the low-pass filter step S101, the signal processing device 100 generates the i-th measurement data $D_i$ by performing a low-pass filter processing on data which is based on the signal output from the i-th sensor 200-$i$ that detects the physical quantity generated due to the vibration of the target object for each integer i of 1 or more and M or less. M is a predetermined integer of 2 or more. The data based on the signal output from the i-th sensor 200-$i$ may be time series data of a digital signal, which is output from the i-th sensor 200-$i$, or may be time series data of a digital signal in which an analog signal output from the i-th sensor 200-$i$ is converted by the analog front end 210-$i$. In the low-pass filter step S101, the signal processing device 100 generates the first to M-th measurement data $D_1$ to $D_M$ in which the low-pass filter processing is performed on the data based on the signals output from the first to M-th sensors 200-1 to 200-M.

Next, the signal processing device 100 performs the measurement data division step S102 similar to the measurement data division step S2 in FIG. 1. Since the detailed procedure of the measurement data division step S102 is the same as the steps S21 to S29 in FIG. 2, the illustration and description thereof will be omitted.

Next, the signal processing device 100 performs the averaged data sequence generation step S103 similar to the averaged data sequence generation step S3 in FIG. 1.

Next, the signal processing device 100 performs the Lissajous figure generation step S104 similar to the Lissajous figure generation step S4 in FIG. 1.

Next, the signal processing device 100 performs the display step S105 similar to the display step S5 in FIG. 1.

Thereafter, the signal processing device 100 repeats steps S101 to S105 until the signal processing is ended (N in step S106).

Figure 15:
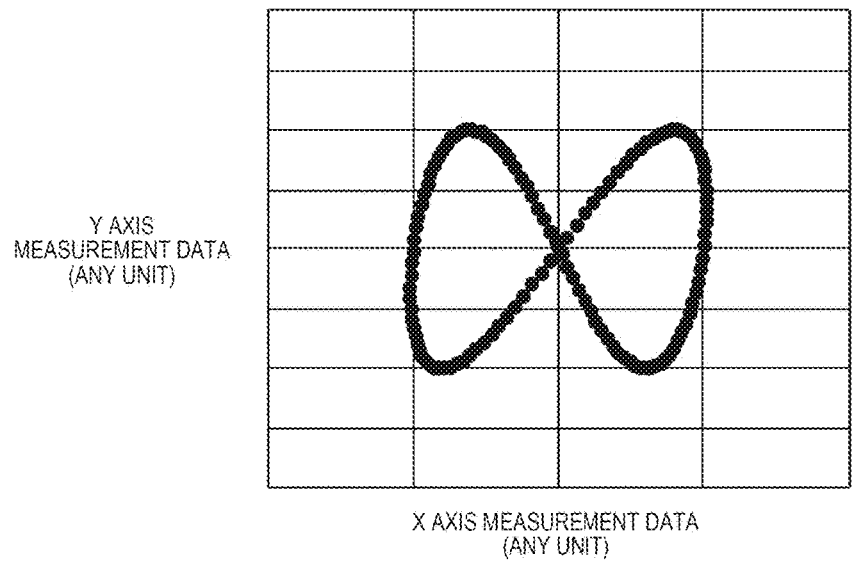
FIG. 15 is a diagram illustrating an example of a screen displayed on a display portion.

As described above, in the second embodiment, the signal processing device 100 generates the first to M-th measurement data $D_1$ to $D_M$ by performing the low-pass filter processing on data which is based on the signals output from the first to M-th sensors 200-1 to 200-M, so that the high frequency noise included in the first to M-th measurement data $D_1$ to $D_M$ becomes smaller. Therefore, the Lissajous figure generated by using the first to M-th measurement data $D_1$ to $D_M$ becomes a figure in which the characteristics of the low frequency signal component are further emphasized. As a specific example, for example, when the first measurement data $D_1$ and the second measurement data $D_2$, which are used for generating the Lissajous figure illustrated in FIG. 10, are subjected to the low-pass filter processing and defined as first measurement data $D_1$ and second measurement data $D_2$ in the present embodiment, when the integer n is defined as 2 or more, the Lissajous figure as illustrated in FIG. 15 is generated. As compared with the Lissajous figure illustrated in FIG. 10, the Lissajous figure illustrated in FIG. 15 is a figure in which fluctuations due to the high frequency noise are reduced and the characteristics of the fundamental wave are further emphasized.

Figure 16:
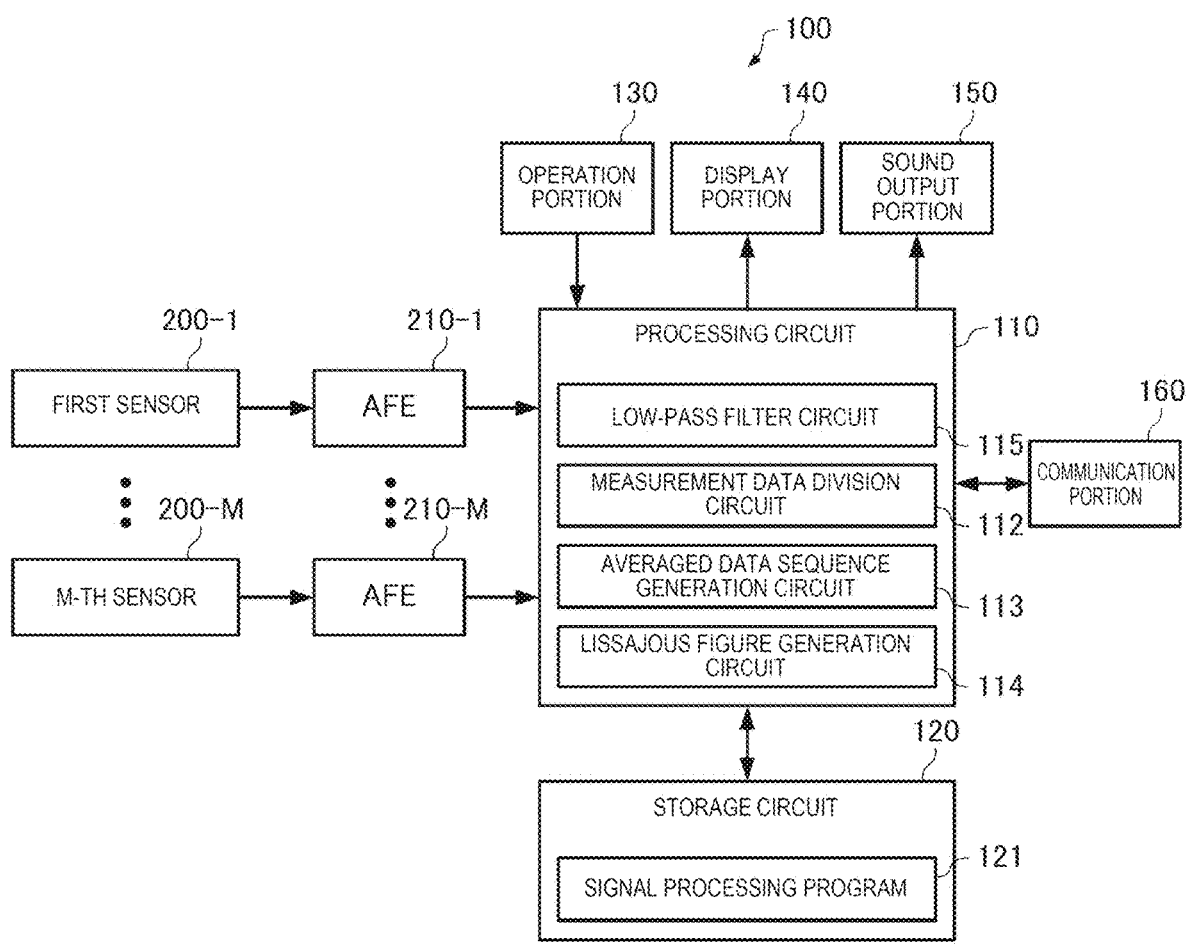
FIG. 16 is a diagram illustrating an example of a configuration of a signal processing device that executes the signal processing method of the second embodiment.

FIG. 16 is a diagram illustrating an example of a configuration of the signal processing device 100 that executes the signal processing method of the second embodiment. As illustrated in FIG. 16, the signal processing device 100 includes the first to M-th sensors 200-1 to 200-M, M analog front ends 210-1 to 210-M, a processing circuit 110, a storage circuit 120, an operation portion 130, the display portion 140, a sound output portion 150, and a communication portion 160. Note that, the signal processing device 100 may have a configuration in which some of the components in FIG. 16 are omitted or changed, or other components are added. For example, the first to M-th sensors 200-1 to 200-M or the analog front ends 210-1 to 210-M do not have to be components of the signal processing device 100.

Since the configurations and functions of the first to M-th sensors 200-1 to 200-M, the analog front ends 210-1 to 210-M, the storage circuit 120, the operation portion 130, the display portion 140, the sound output portion 150, and the communication portion 160 are the same as those in the first embodiment, the description thereof will be omitted.

By executing the signal processing program 121 that is stored in the storage circuit 120, the processing circuit 110 functions as a low-pass filter circuit 115, a measurement data division circuit 112, an averaged data sequence generation circuit 113, and a Lissajous figure generation circuit 114. That is, the signal processing device 100 includes the low-pass filter circuit 115, the measurement data division circuit 112, the averaged data sequence generation circuit 113, and the Lissajous figure generation circuit 114.

The low-pass filter circuit 115 generates the i-th measurement data $D_i$ by performing a low-pass filter processing on data which is based on the signal output from the i-th sensor 200-$i$ that detects the physical quantity generated due to the vibration of the target object for each integer i of 1 or more and M or less. That is, the low-pass filter circuit 115 executes the low-pass filter step S101 in FIG. 14. The i-th measurement data $D_i$ generated by the low-pass filter circuit 115 is stored in the storage circuit 120.

The measurement data division circuit 112, the averaged data sequence generation circuit 113, and the Lissajous figure generation circuit 114 execute the measurement data division step S102, the averaged data sequence generation step S103, and the Lissajous figure generation step S104 in FIG. 14, respectively. Since the functions of the measurement data division circuit 112, the averaged data sequence generation circuit 113, and the Lissajous figure generation circuit 114 are the same as those in the first embodiment, the description thereof will be omitted.

According to the signal processing method of the second embodiment described above, the same effect as the signal processing method of the first embodiment can be obtained. Further, according to the signal processing method of the second embodiment, the fluctuation of the high frequency noise is reduced by the low-pass filter processing so that the Lissajous figure in which the low frequency signal component is emphasized can be obtained. Since the signal component of the low frequency is likely to be affected by the characteristics or changes in a state of the target object, the user can correctly recognize the characteristics or changes in the state of the target object based on the Lissajous figure.

1-3. Third Embodiment

Hereinafter, with regard to a third embodiment, the same components as those of the first embodiment or the second embodiment are given the same reference numerals, the description overlapping with the first embodiment or the second embodiment is omitted or simplified, and the contents different from the first embodiment or the second embodiment will be mainly described.

Since the procedure of the signal processing method of the third embodiment is the same as that in FIG. 1 or FIG. 14, the illustration thereof will be omitted. In the signal processing method of the third embodiment, the procedure of the measurement data division step S2 is different from that of the first embodiment, and the procedures of the measurement data acquisition step S1, the averaged data sequence generation step S3, the Lissajous figure generation step S4, and the display step S5 are the same as those in the first embodiment. Alternatively, in the signal processing method of the third embodiment, the procedure of the measurement data division step S102 is different from that of the second embodiment, and the procedures of the low-pass filter step S101, the averaged data sequence generation step S103, the Lissajous figure generation step S104, and the display step S105 are the same as those in the second embodiment.

Figure 17:
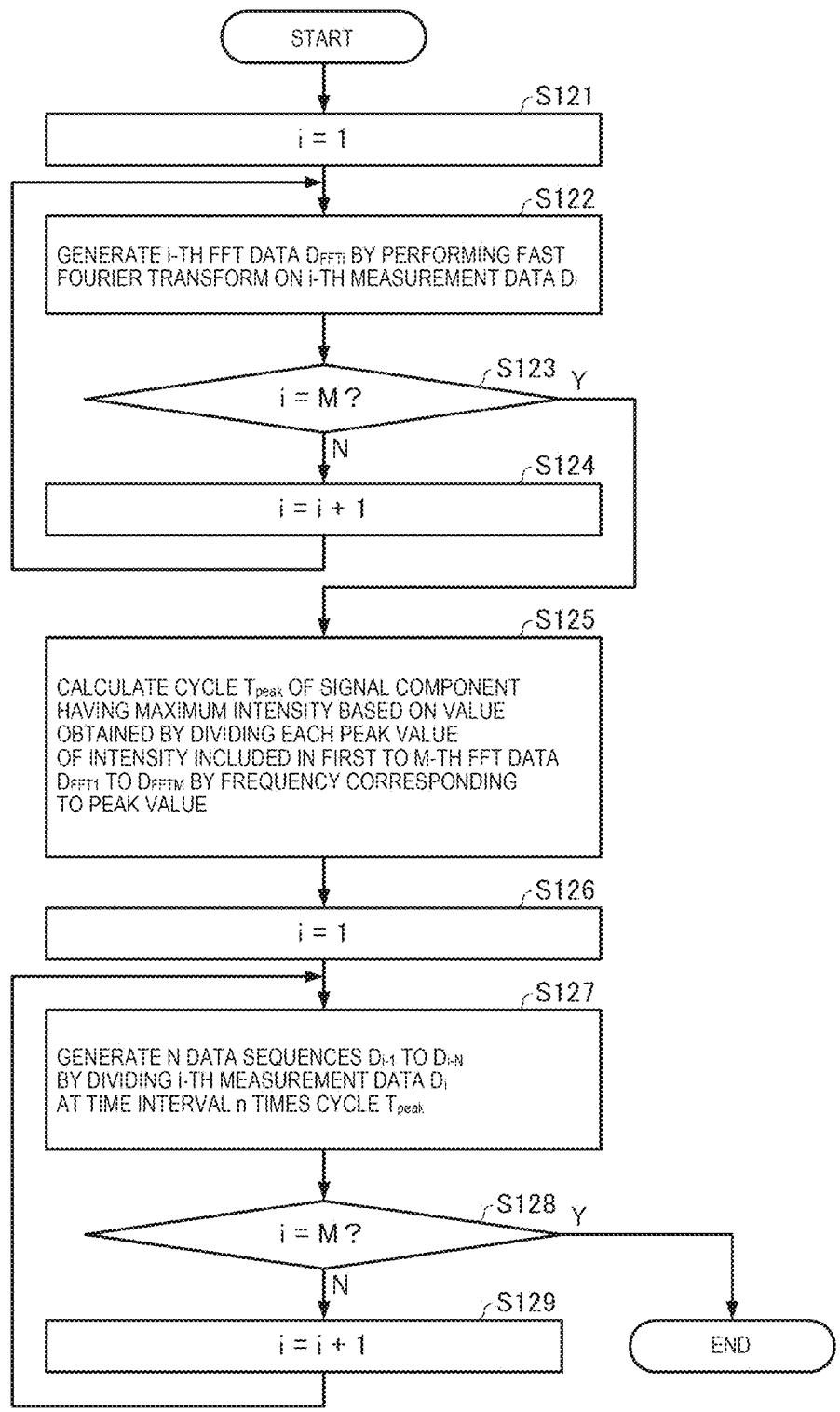
FIG. 17 is a flowchart illustrating an example of a procedure of a measurement data division step according to a third embodiment.

FIG. 17 is a flowchart illustrating an example of the procedure of the measurement data division step S2 or the measurement data division step S102 in the third embodiment.

As illustrated in FIG. 17, the signal processing device 100 first sets the integer i to 1 in step S121, and, in step s122, generates i-th FFT data $D_{FFTi}$ by performing a fast Fourier transform on the i-th measurement data $D_i$ acquired in step S1 in FIG. 1 or generated in step S101 in FIG. 14.

Thereafter, the signal processing device 100 repeats step S122 by increasing the integer i by 1 in step S124 until the integer i becomes M (N in step S123). That is, in the steps S122 to S124, the signal processing device 100 generates the first to M-th FFT data $D_{FFT1}$ to $D_{FFTM}$ by performing a fast Fourier transform on each of the first to M-th measurement data $D_1$ to $D_M$.

Next, when the integer i becomes M (Y in step S123), in step S125, the signal processing device 100 calculates a cycle $T_{peak}$ of the signal component having the maximum intensity based on a value obtained by dividing each peak value of the intensity included in the first to M-th FFT data $D_{FFT1}$ to $D_{FFTM}$ by the frequency corresponding to the peak value. For example, in step S125, the signal processing device 100 may calculate the cycle $T_{peak}$ by adding the value, which is obtained by dividing each peak value of the intensity included in the first to M-th FFT data $D_{FFT1}$ to $D_{FFTM}$ by the frequency corresponding to the peak value, for each frequency and calculating the reciprocal of the frequency at which the peak value after the addition becomes the maximum.

As a specific example, for example, it is assumed that each of the signal components of a fundamental wave of Hz, a second-order harmonic of 20 Hz, a third-order harmonic of 30 Hz, and a fourth-order harmonic of 40 Hz is included in the first to M-th measurement data $D_1$ to $D_M$. In this case, the signal processing device 100 calculates a value obtained by dividing the peak value of 10 Hz by 10 Hz, a value obtained by dividing the peak value of 20 Hz by 20 Hz, a value obtained by dividing the peak value of 30 Hz by 30 Hz, and a value obtained by dividing the peak value of 40 Hz by 40 Hz, for each of the first to M-th FFT data $D_{FFT1}$ to $D_{FFTM}$, respectively. By this calculation, the peak value of the lower frequency becomes larger, so that the cycle of the fundamental wave of 0.1 seconds can be easily calculated as the cycle $T_{peak}$.

Next, the signal processing device 100 sets the integer i to 1 in step S126, and in step S127, generates the N data sequences $D_{i-1}$ to $D_{i-N}$ by dividing the i-th measurement data $D_i$, which is acquired in step S1 in FIG. 1, or generated in the step S101 in FIG. 14, at a time interval n times the cycle $T_{peak}$ calculated in step S125. n is an integer of 1 or more. That is, in step S127, the signal processing device 100 divides the i-th measurement data $D_i$, and generates the N data sequences to $D_{i-N}$ each having a time length n times the cycle $T_{peak}$. Note that, as described above, the time length of the i-th measurement data $D_i$ may be longer than n×N times the cycle $T_{peak}$. Further, even when the intensity of the second-order harmonic of the fundamental wave based on the vibration of the target object is maximum, the integer n is preferably 2 or more so that the signal components of the fundamental wave are included in the N data sequences $D_{i-1}$ to $D_{i-N}$.

Thereafter, the signal processing device 100 repeats step S127 by increasing the integer i by 1 in step S129 until the integer i becomes M (N in step S128), and when the integer i becomes M (Y in step S128), the measurement data division step S2 or the measurement data division step S102 is ended. That is, in steps S127 to S129, the signal processing device 100 generates the N data sequences $D_{i-1}$ to $D_{i-N}$ for each of the first to M-th measurement data $D_i$ to $D_M$.

Since the example of the configuration of the signal processing device 100 in the third embodiment is the same as that in FIG. 13 or FIG. 16, the illustration thereof will be omitted. However, in the present embodiment, the measurement data division circuit 112 generates the i-th FFT data $D_{FFTi}$ by performing a fast Fourier transform on the i-th measurement data $D_i$ for each integer i of 1 or more and M or less, calculates the cycle $T_{peak}$ of the signal component having the maximum intensity based on the value obtained by dividing each peak value of the intensity included in the first to M-th FFT data $D_{FFT1}$ to $D_{FFTM}$ by the frequency corresponding to the peak value, and generates the N data sequences $D_{i-1}$ to $D_{i-N}$ by dividing the i-th measurement data $D_i$ at a time interval n times the cycle $T_{peak}$ for each integer i of 1 or more and M or less. That is, the measurement data division circuit 112 executes steps S121 to S129 in FIG. 17. Since other configurations and functions of the signal processing device 100 in the third embodiment are the same as those in the first embodiment or the second embodiment, the description thereof will be omitted.

As described above, in the third embodiment, the signal processing device 100 calculates a cycle $T_{peak}$ of the signal component having the maximum intensity based on a value obtained by dividing each peak value of the intensity included in the first to M-th FFT data $D_{FFT1}$ to $D_{FFTM}$ by the frequency corresponding to the peak value. Therefore, for example, even when the intensity of the fundamental wave and the intensity of the second-order harmonic are substantially the same, the cycle of the fundamental wave, which is a lower frequency, is calculated as the cycle $T_{peak}$, and even when the integer n is 1, the signal components of the fundamental wave are included in the N data sequences $D_{i-1}$ to $D_{i-N}$ generated for each of the first to M-th measurement data $D_1$ to $D_M$, thereby, the correct Lissajous figure is generated. As a specific example, for example, a signal component of 20 Hz, which is the fundamental wave, and each signal component of the harmonic are included in the first measurement data $D_1$ and the second measurement data $D_2$, and the intensity of the signal component of 20 Hz, which is the fundamental wave, and the intensity of the signal component of the second-order harmonic, which is 40 Hz, are substantially the same, and it is assumed that the intensity of either one is the largest at any time. In this case, when the integer n is defined as 1, in the first embodiment or the second embodiment, either the Lissajous figure as illustrated in FIG. 9 or the Lissajous figure as illustrated in FIG. 10 is generated as the time elapses. That is, since the generated Lissajous figure is not stable, the user cannot properly estimate the change in the state of the target object even when the time change of the Lissajous figure is monitored. In contrast to this, in the third embodiment, the Lissajous figure as illustrated in FIG. 10 is stably generated even when time elapses so that by monitoring the time change of the Lissajous figure, the user can more accurately estimate the change in the state of the target object.

According to the third embodiment described above, the same effect as the signal processing method of the first embodiment or the second embodiment can be obtained. Further, in the signal processing method of the third embodiment, by dividing each peak value of the intensity included in the first to M-th FFT data $D_{FFT1}$ to $D_{FFTM}$ by the frequency corresponding to the peak value, the ratio of the intensity of the signal component of the low frequency with respect to the intensity of the signal component of the high frequency becomes large, thereby the intensity of the signal component of the low frequency tends to be maximized. Therefore, according to the signal processing method of the third embodiment, the Lissajous figure in which the characteristics of the signal components of the low frequency included in the first to M-th measurement data $D_1$ to $D_M$ are emphasized, can be obtained. Since the signal component of the low frequency is likely to be affected by the characteristics or changes in a state of the target object, the user can correctly recognize the characteristics or changes in the state of the target object based on the Lissajous figure.

1-4. Fourth Embodiment

Hereinafter, with regard to a fourth embodiment, the same components as those of the first embodiment or the second embodiment are given the same reference numerals, the description overlapping with the first embodiment or the second embodiment is omitted or simplified, and the contents different from the first embodiment or the second embodiment will be mainly described.

Since the procedure of the signal processing method of the fourth embodiment is the same as that in FIG. 1 or FIG. 14, the illustration thereof will be omitted. In the signal processing method of the fourth embodiment, the procedure of the measurement data division step S2 is different from that of the first embodiment, and the procedures of the measurement data acquisition step S1, the averaged data sequence generation step S3, the Lissajous figure generation step S4, and the display step S5 are the same as those in the first embodiment. Alternatively, in the signal processing method of the third embodiment, the procedure of the measurement data division step S102 is different from that of the second embodiment, and the procedures of the low-pass filter step S101, the averaged data sequence generation step S103, the Lissajous figure generation step S104, and the display step S105 are the same as those in the second embodiment.

Figure 18:
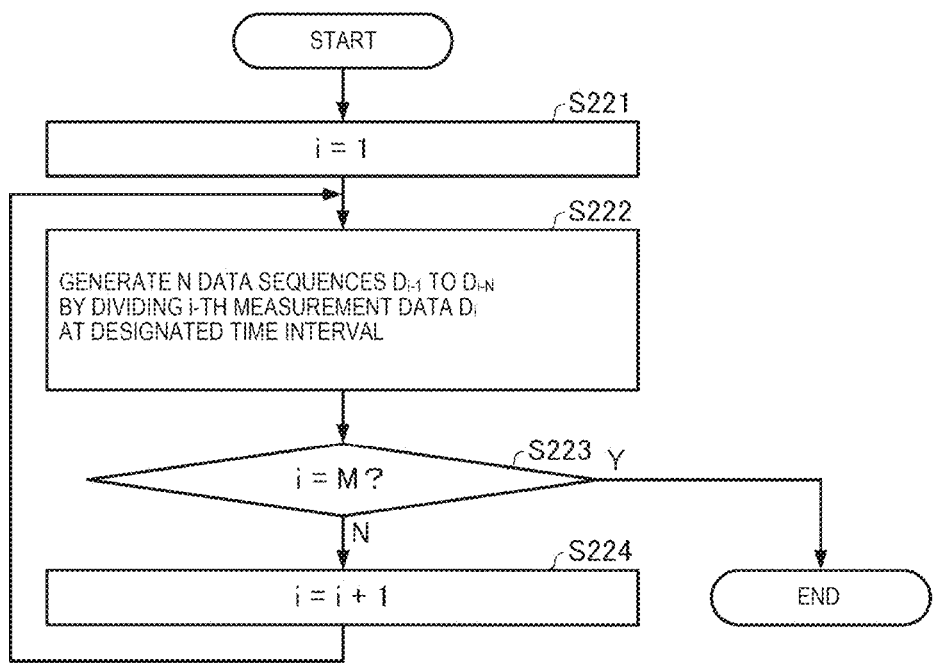
FIG. 18 is a flowchart illustrating an example of a procedure of a measurement data division step according to a fourth embodiment.

FIG. 18 is a flowchart illustrating an example of the procedure of the measurement data division step S2 or the measurement data division step S102 in the fourth embodiment.

As illustrated in FIG. 18, the signal processing device 100 first sets the integer i to 1 in step S221, and, in step S222, generates the N data sequences $D_{i-1}$ to $D_{i-N}$ by dividing the i-th measurement data $D_i$, which is acquired in step S1 in FIG. 1 or generated in the step S101 in FIG. 14, at the designated time interval. For example, the user may designate the time interval itself for dividing the i-th measurement data $D_i$, and the signal processing device 100 may divide the i-th measurement data $D_i$ at the designated time interval. Alternatively, the user may designate the cycle $T_{peak}$ and the integer n described above, and the signal processing device 100 may divide the i-th measurement data $D_i$ by the time interval calculated by the product of the cycle $T_{peak}$ and the integer n. That is, the user may indirectly designate the time interval for dividing the i-th measurement data $D_i$. Note that, as described above, the user preferably designates the time interval equal to or greater than the cycle of the fundamental wave so that the signal components of the fundamental wave are included in the N data sequences $D_{i-1}$ to $D_{i-N}$.

Thereafter, the signal processing device 100 repeats step S222 by increasing the integer i by 1 in step S224 until the integer i becomes M (N in step S223), and when the integer i becomes M (Y in step S223), the measurement data division step S2 or the measurement data division step S102 is ended. That is, in steps S222 to S224, the signal processing device 100 generates the N data sequences $D_{i-1}$ to $D_{i-N}$ for each of the first to M-th measurement data $D_i$ to $D_M$.

Figure 19:
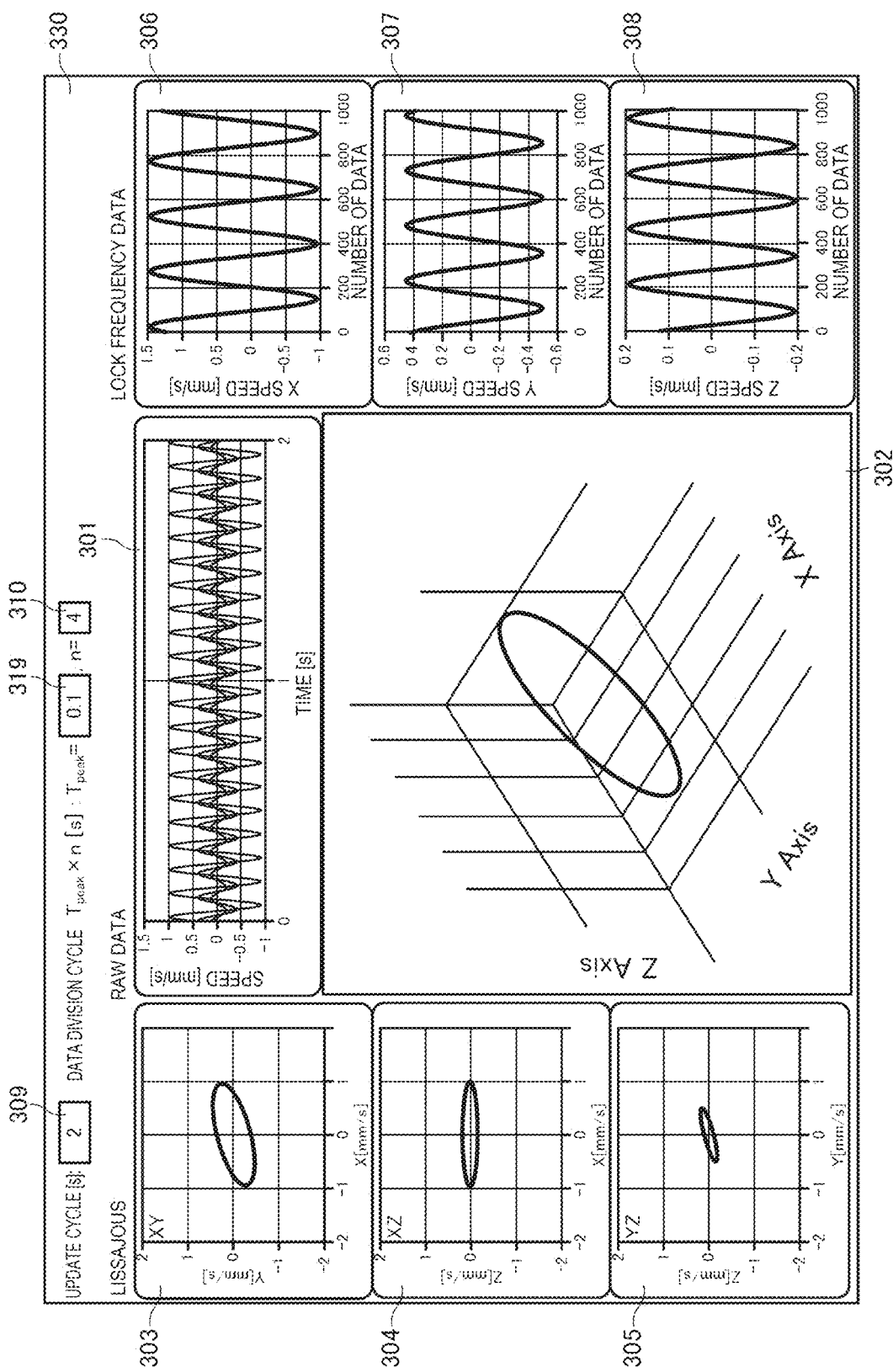
FIG. 19 is a diagram illustrating an example of a screen displayed on a display portion.
Figure 20:
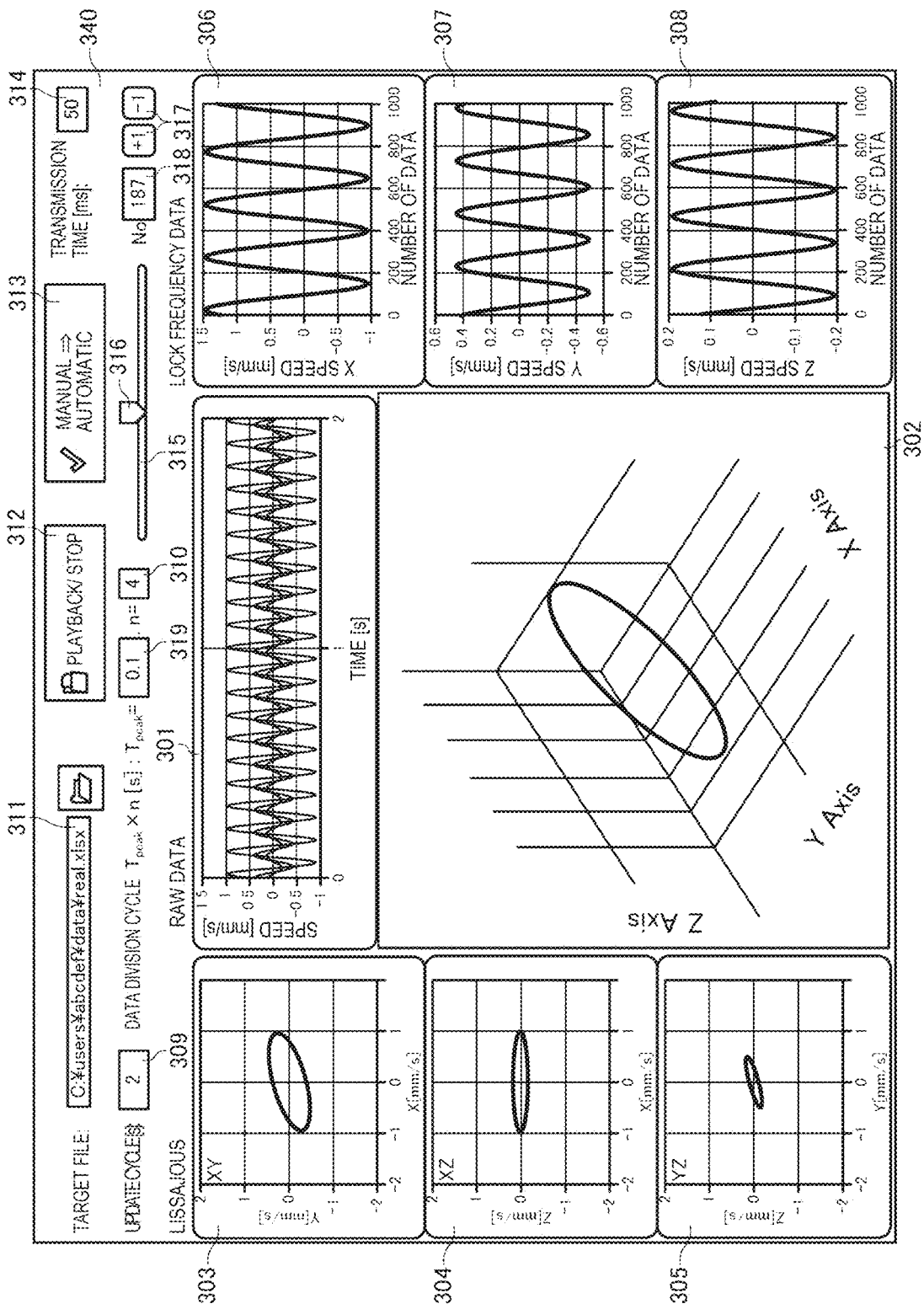
FIG. 20 is a diagram illustrating an example of a screen displayed on the display portion.

FIGS. 19 and 20 are diagrams illustrating an example of a screen displayed in real time on the display portion in the present embodiment. In FIG. 19, the same components as those in FIG. 11 are designated by the same reference numerals. Further, in FIG. 20, the same components as those in FIG. 12 are designated by the same reference numerals. The screen 330 illustrated in FIG. 19 has the same components as the screen 300 illustrated in FIG. 11, and further includes a fourth input portion 319. Similarly, the screen 340 illustrated in FIG. 20 has the same components as the screen 300 illustrated in FIG. 12, and further includes a fourth input portion 319.

The user inputs the cycle $T_{peak}$ of the data division cycle $T_{peak} \times n$ to the fourth input portion 319. On the screen 330 illustrated in FIG. 19 and the screen 340 illustrated in FIG. 20, 0.1 seconds is input to the fourth input portion 319 as the cycle $T_{peak}$. Further, 4 is input as an integer n to the second input portion 310. The signal processing device 100 divides each of the X axis speed data that is the first measurement data $D_1$, the Y axis speed data that is the second measurement data $D_2$, and the Z axis speed data that is the third measurement data $D_3$, into the time interval that is calculated by the product of the cycle $T_{peak}$ and the integer n, for each integer i of 1 or more and M or less, and generates the X axis lock frequency data that is the N data sequences $D_{i-1}$ to $D_{i-N}$, the Y axis lock frequency data that is the N data sequences $D_{2-1}$ to $D_{2-N}$, and the Z axis lock frequency data that is the N data sequences $D_{3-1}$ to $D_{3-N}$. Since 2 seconds is input to the first input portion 309 as the update cycle, the integer N is 5.

The data division cycle $T_{peak} \times n$ may be input on the screen 330 in FIG. 19 or the screen 340 in FIG. 20.

Since the example of the configuration of the signal processing device 100 in the fourth embodiment is the same as that in FIG. 13 or FIG. 16, the illustration thereof will be omitted. However, in the present embodiment, the measurement data division circuit 112 generates the N data sequences $D_{i-1}$ to $D_{i-N}$ by dividing the i-th measurement data $D_i$ at the designated time interval for each integer i of 1 or more and M or less. That is, the measurement data division circuit 112 executes steps S221 to S224 in FIG. 18. Since other configurations and functions of the signal processing device 100 in the fourth embodiment are the same as those in the first embodiment or the second embodiment, the description thereof will be omitted.

According to the fourth embodiment described above, the same effect as the signal processing method of the first embodiment to the third embodiment can be obtained. Further, in the signal processing method of the fourth embodiment when the cycle of the fundamental wave of the vibration of the target object is known, by designating the cycle of the fundamental wave and dividing the first to M-th measurement data $D_i$ to $D_M$, the Lissajous figure having the characteristics of the signal component of the fundamental wave can be obtained. Since the signal component of the fundamental wave is likely to be affected by the characteristics or changes in a state of the target object, the user can correctly recognize the characteristics or changes in the state of the target object based on the Lissajous figure.

1-5. Fifth Embodiment

Hereinafter, with regard to a fifth embodiment, the same components as any of the first embodiment to the fourth embodiment are given the same reference numerals, the description overlapping with any of the first embodiment to the fourth embodiment is omitted or simplified, and the contents different from the first embodiment to the fourth embodiment will be mainly described.

Figure 21:
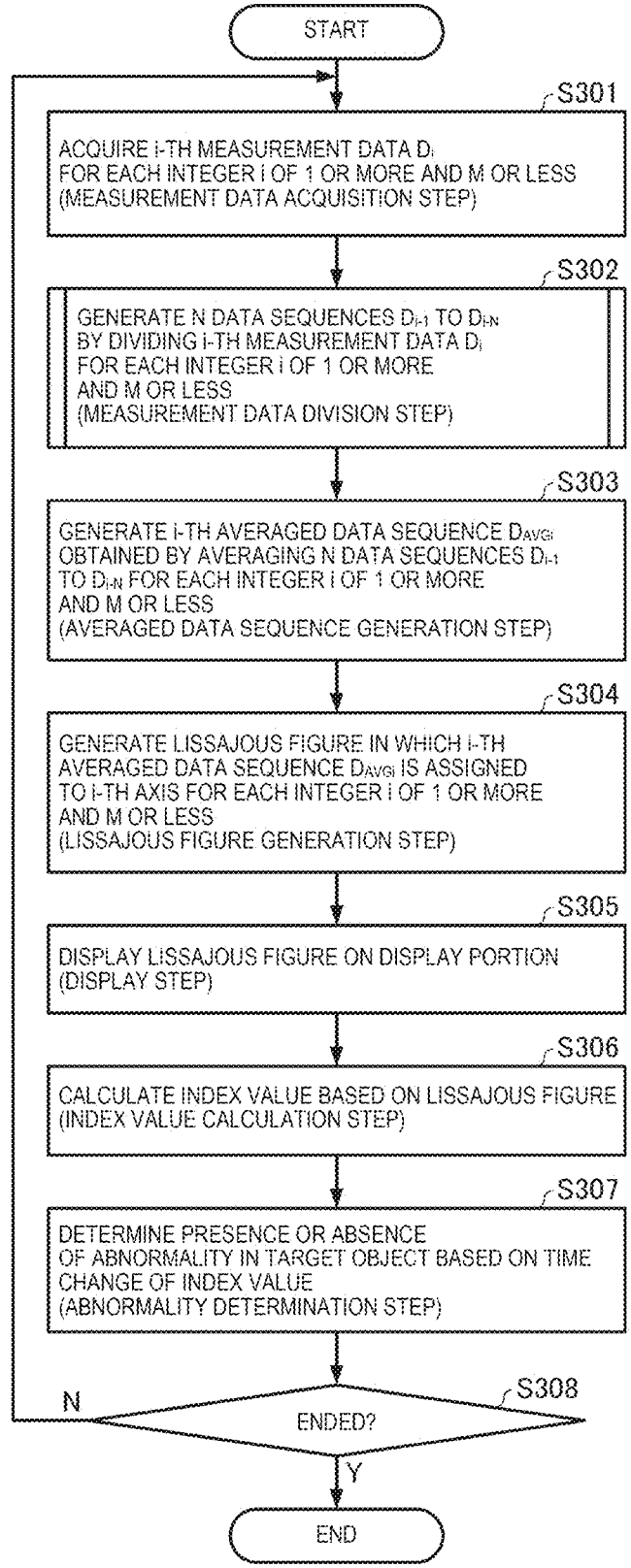
FIG. 21 is a flowchart illustrating a procedure of a signal processing method according to a fifth embodiment.

FIG. 21 is a flowchart illustrating a procedure of a signal processing method of the fifth embodiment. As illustrated in FIG. 21, the signal processing method of the fifth embodiment includes a measurement data acquisition step S301, a measurement data division step S302, an averaged data sequence generation step S303, a Lissajous figure generation step S304, a display step S305, an index value calculation step S306, and an abnormality determination step S307. Note that, in the signal processing method of the fifth embodiment in FIG. 21, some of these steps may be omitted or changed, or other steps may be added. The signal processing method of the fifth embodiment illustrated in FIG. 21 is executed by, for example, a signal processing device 100. An example of a configuration of the signal processing device 100 that executes the signal processing method illustrated in FIG. 21 will be described later.

As illustrated in FIG. 21, first, the signal processing device 100 performs the measurement data acquisition step S301 similar to the measurement data acquisition step S1 in FIG. 1.

Next, the signal processing device 100 performs the measurement data division step S302 similar to the measurement data division step S2 in FIG. 1. Since the detailed procedure of the measurement data division step S302 is the same as the steps S21 to S29 in FIG. 2, the illustration and description thereof will be omitted.

Next, the signal processing device 100 performs the averaged data sequence generation step S303 similar to the averaged data sequence generation step S3 in FIG. 1.

Next, the signal processing device 100 performs the Lissajous figure generation step S304 similar to the Lissajous figure generation step S4 in FIG. 1.

Next, the signal processing device 100 performs the display step S305 similar to the display step S5 in FIG. 1.

Next, in the index value calculation step S306, the signal processing device 100 calculates the index value based on the Lissajous figure generated in the Lissajous figure generation step S304.

Next, in the abnormality determination step S307, the signal processing device 100 determines the presence or absence of an abnormality in the target object based on the time change of the index value calculated in the index value calculation step S306.

Thereafter, the signal processing device 100 repeats steps S301 to S307 until the signal processing is ended (N in step S308).

Figure 22:
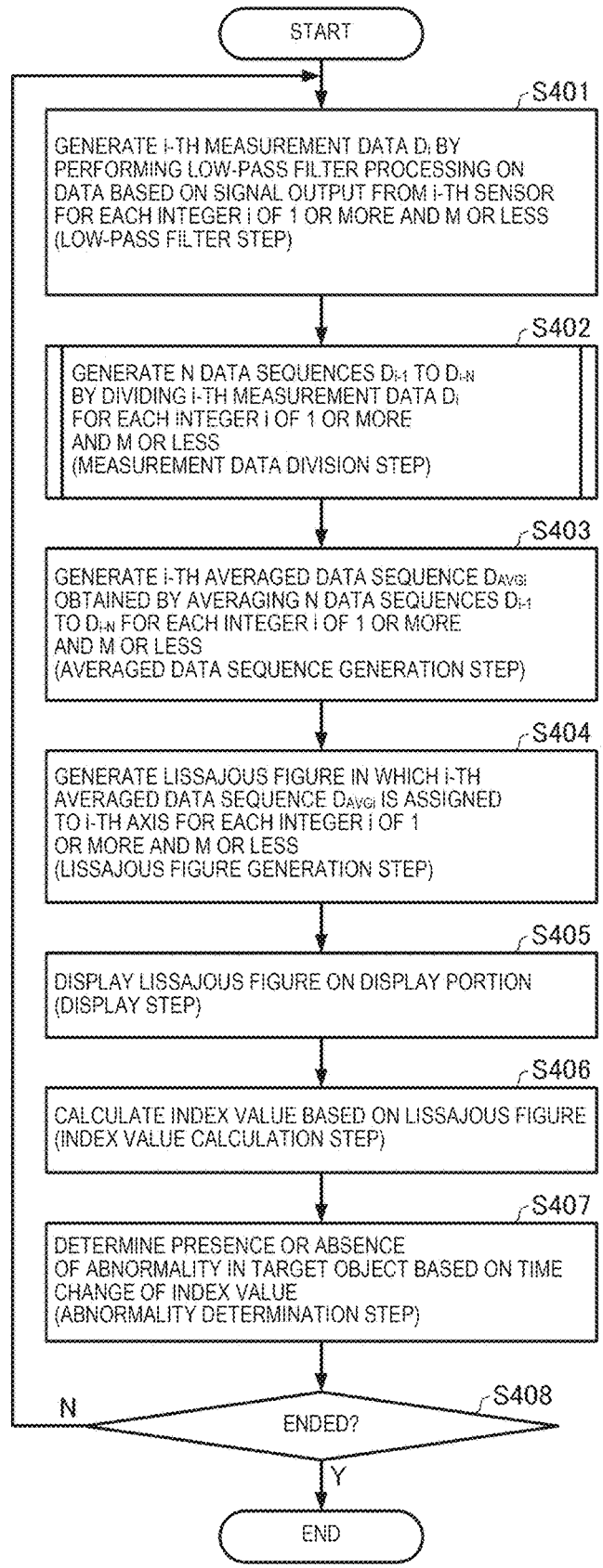
FIG. 22 is a flowchart illustrating another procedure of the signal processing method of the fifth embodiment.

FIG. 22 is a flowchart illustrating another procedure of the signal processing method of the fifth embodiment. As illustrated in FIG. 22, the signal processing method of the fifth embodiment includes a low-pass filter step S401, a measurement data division step S402, an averaged data sequence generation step S403, a Lissajous figure generation step S404, a display step S405, an index value calculation step S406, and an abnormality determination step S407. Note that, in the signal processing method of the fifth embodiment in FIG. 22, some of these steps may be omitted or changed, or other steps may be added. The signal processing method of the fifth embodiment illustrated in FIG. 22 is executed by, for example, a signal processing device 100. An example of a configuration of the signal processing device 100 that executes the signal processing method illustrated in FIG. 22 will be described later.

As illustrated in FIG. 22, first, the signal processing device 100 performs the low-pass filter step S401 similar to the low-pass filter step S101 in FIG. 14.

Next, the signal processing device 100 performs the measurement data division step S402 similar to the measurement data division step S102 in FIG. 14. Since the detailed procedure of the measurement data division step S402 is the same as the steps S21 to S29 in FIG. 2, the illustration and description thereof will be omitted.

Next, the signal processing device 100 performs the averaged data sequence generation step S403 similar to the averaged data sequence generation step S103 in FIG. 14.

Next, the signal processing device 100 performs the Lissajous figure generation step S404 similar to the Lissajous figure generation step S104 in FIG. 14.

Next, the signal processing device 100 performs the display step S405 similar to the display step S105 in FIG. 14.

Next, in the index value calculation step S406, the signal processing device 100 calculates the index value based on the Lissajous figure generated in the Lissajous figure generation step S404.

Next, in the abnormality determination step S407, the signal processing device 100 determines the presence or absence of an abnormality in the target object based on the time change of the index value calculated in the index value calculation step S406.

Thereafter, the signal processing device 100 repeats steps S401 to S407 until the signal processing is ended (N in step S408).

FIGS. 23 to 27 are diagrams for explaining a specific example of the index with which the value is calculated in the index value calculation step S406.

Figure 23:
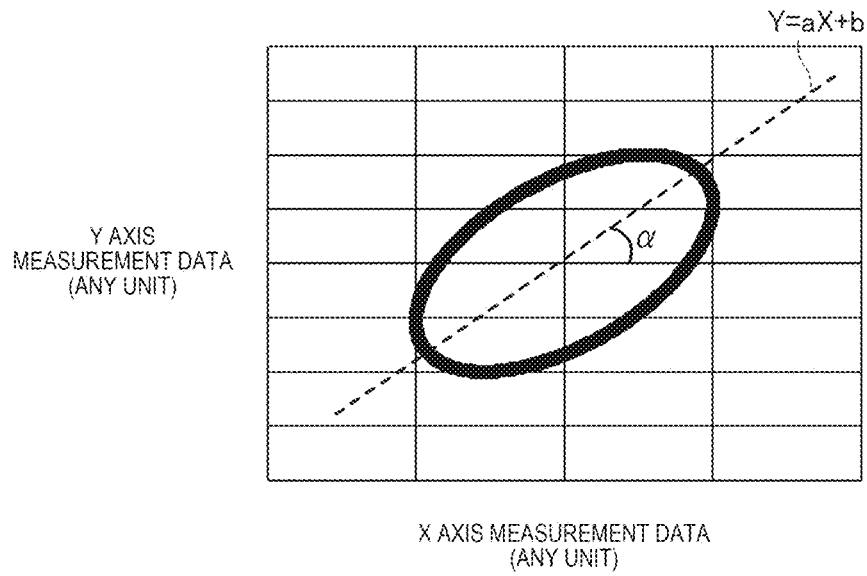
FIG. 23 is a diagram for describing a specific example of an index.

As illustrated in FIG. 23, for example, an angle $\alpha$=arctan (a) formed by a linear approximation straight line Y=aX+b and a straight line Y=0 of the Lissajous figure on the XY plane may be used as an index. Since the angle $\alpha$ changes according to the ratio of the amplitude in the X axis direction to the amplitude in the Y axis direction of the Lissajous figure, it is an index sensitive to the change in a shape of the Lissajous figure. Similarly, for the Lissajous figure on the XZ plane or the Lissajous figure on the YZ plane, the same angle as the angle $\alpha$ may be used as an index.

Figure 24:
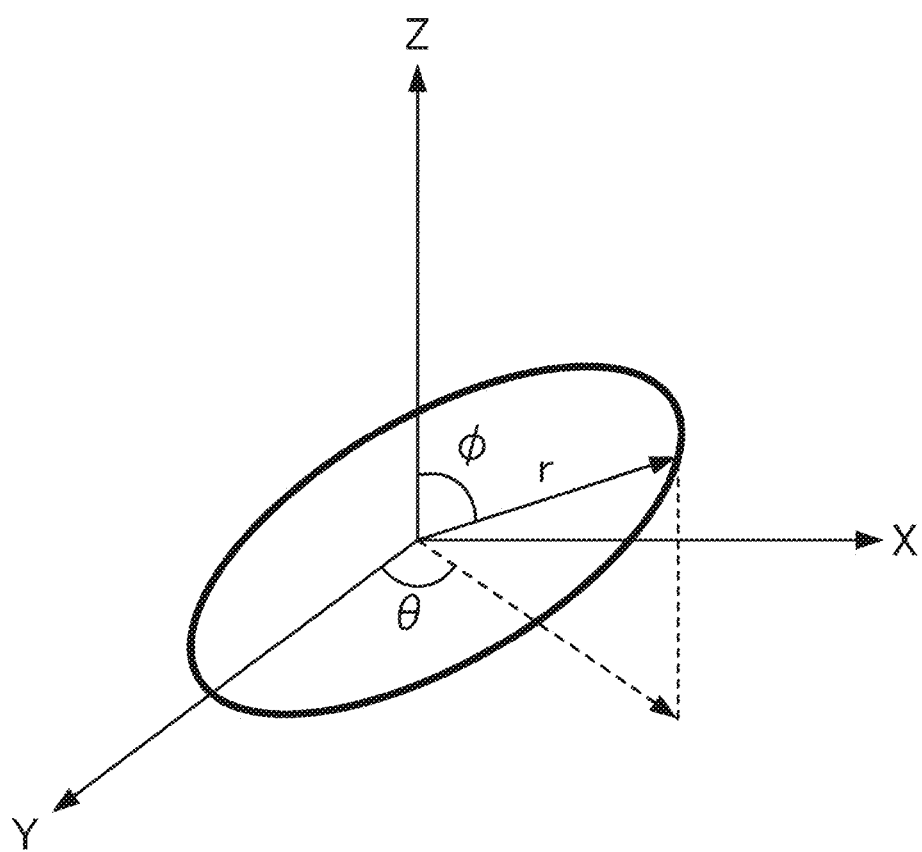
FIG. 24 is a diagram for describing a specific example of the index.

As illustrated in FIG. 24, each point on which the Lissajous figure is drawn in the XYZ space can be represented with polar coordinates (r, $\theta$, $\varphi$), and an index related to the polar coordinates (r, $\theta$, $\varphi$) can also be considered. r is a distance between an original point of the XYZ space and each point. $\theta$ is an angle formed by the Y axis and a straight line connecting the original point and a point where each point is projected on the XY plane. $\varphi$ is an angle formed by the Z axis and a straight line connecting each point and the original point.

Figure 25:
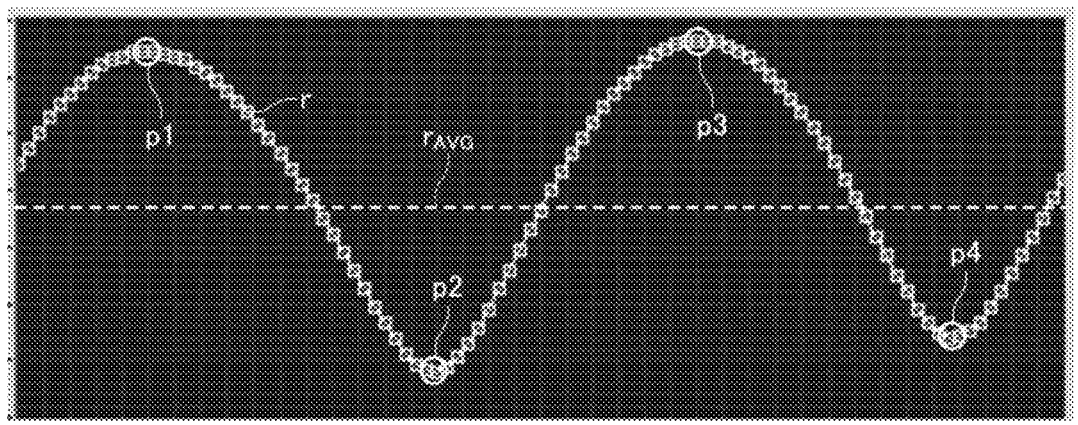
FIG. 25 is a diagram for describing a specific example of the index.

FIG. 25 is a diagram for explaining an index related to a distance r. In the example in FIG. 25, one cycle of the Lissajous figure having an elliptical shape is drawn for each update cycle, and two points p1 and p3 where the distance r is the maximum value, and two points p2 and p4 where the distance r is the minimum value appear. The distance r becomes the second largest maximum value at the point p1, becomes the smallest minimum value at the point p2, becomes the largest maximum value at the point p3, and becomes the second smallest minimum value at the point p4. Further, $r_{AVG}$ is an average value of the distance r.

Examples of the index related to the distance r include a flatness ratio, an amplitude, a recess ratio, the number of meanders, and the like. A value of the flatness ratio is calculated by subtracting the product of the smallest minimum value and the largest minimum value of the distance r from 1. The amplitude is the average value $r_{AVG}$ of the distance r. The recess ratio is calculated by subtracting the second smallest minimum value from the smallest minimum value of the distance r. The number of meanders is the number of extreme values of the distance r. When the Lissajous figure is an ellipse, the number of meanders is 4, and when the Lissajous figure is a perfect circle, the number of meanders is 0.

Figure 26:
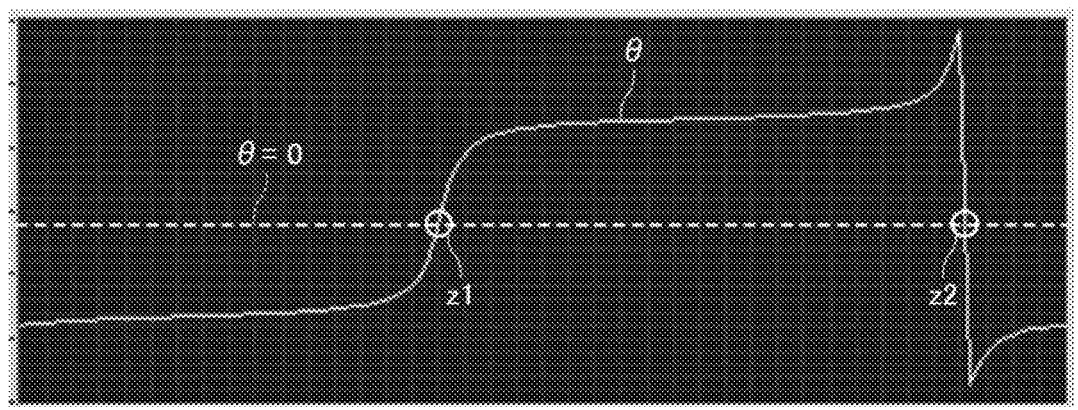
FIG. 26 is a diagram for describing a specific example of the index.

FIG. 26 is a diagram for explaining an index related to the angle $\theta$. In the example in FIG. 26, one cycle of the Lissajous figure having an elliptical shape is drawn for each update cycle, and two points z1 and z2 in which the angle $\theta$ is zero appear. The number of rotations can be mentioned as an index related to the angle $\theta$. The number of rotations is the number of times the angle $\theta$ becomes zero. When the Lissajous figure is an ellipse or a perfect circle, the number of rotations is 2.

Figure 27:
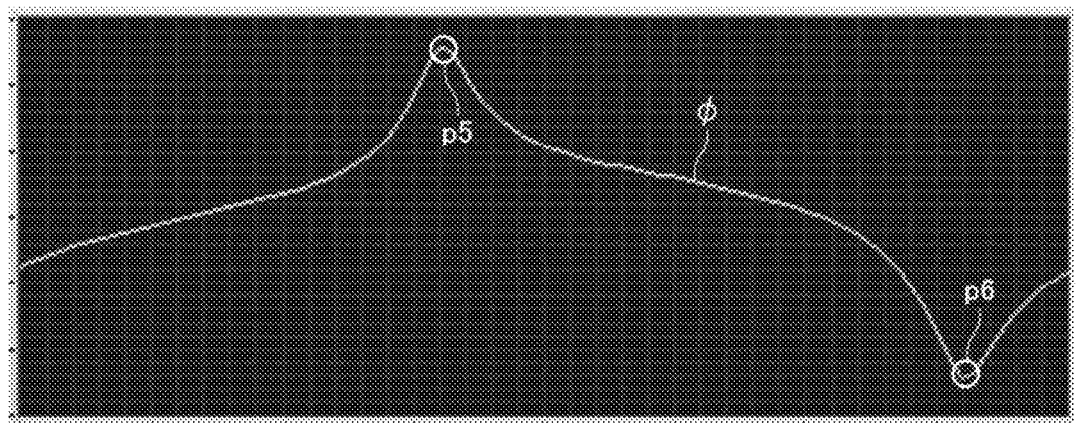
FIG. 27 is a diagram for describing a specific example of the index.

FIG. 27 is a diagram for explaining an index related to the angle $\varphi$. In the example in FIG. 27, one cycle of the Lissajous figure having an elliptical shape is drawn for each update cycle, and one point p5 where the angle $\varphi$ is the maximum value, and one point p6 where the angle $\varphi$ is the minimum value appear. As an index related to the angle $\varphi$, the number of twists can be mentioned. The number of twists is the number of extreme values of the angle $\varphi$. When the Lissajous figure is an ellipse or a perfect circle, the number of twists is 2.

The larger the amount of change in the index value, the larger the change in the state of the target object. Therefore, for example, in the signal processing device 100, in the abnormality determination steps S307 and S407, when the amount of time change of the index value is smaller than a predetermined threshold value, the target object is normal, and the amount of time change of the index value is larger than the predetermined threshold value, it may be determined that the target object is abnormal.

Figure 28:
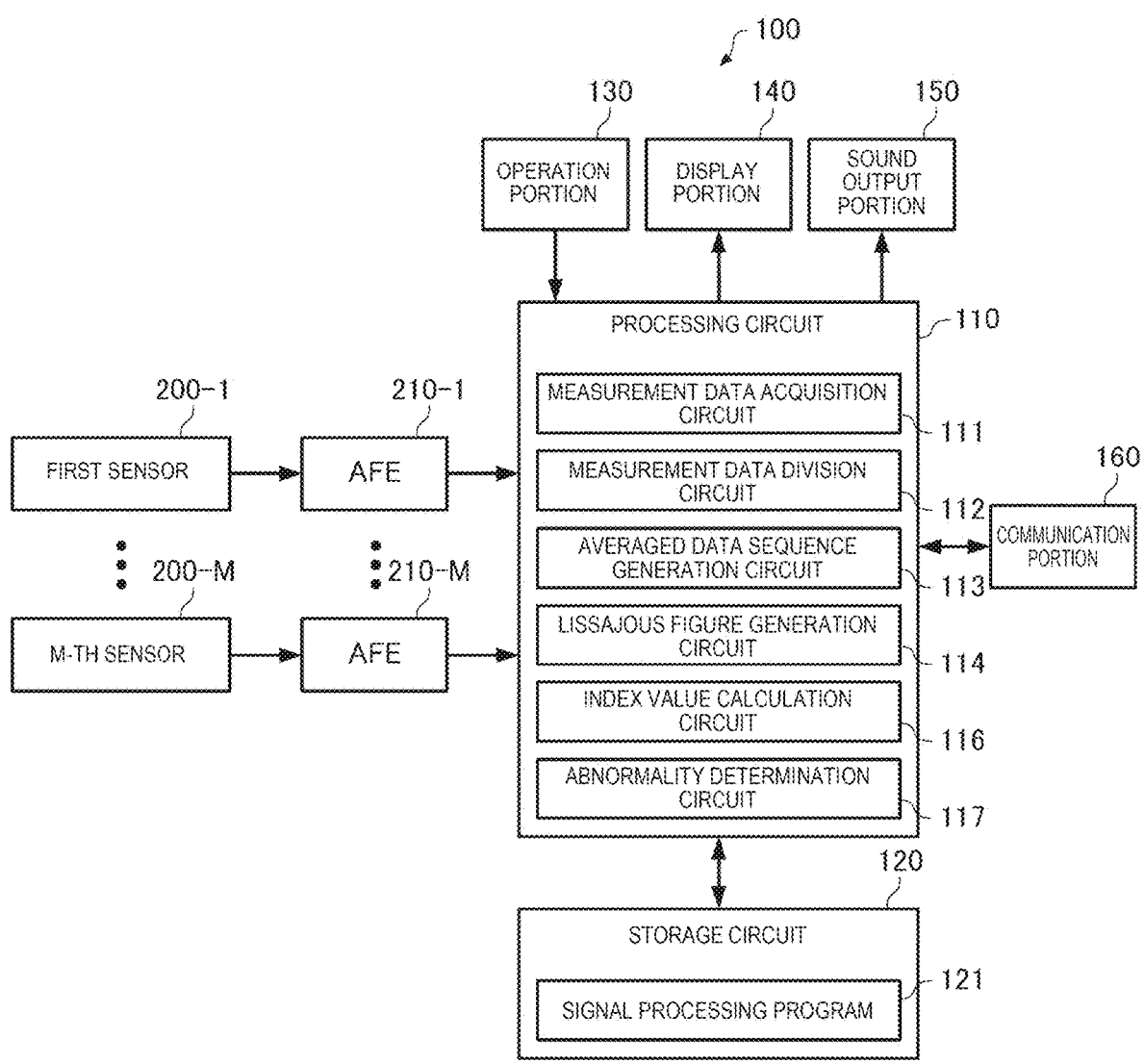
FIG. 28 is a diagram illustrating an example of a configuration of a signal processing device that executes the signal processing method of the fifth embodiment.

FIG. 28 is a diagram illustrating an example of a configuration of the signal processing device 100 that executes the signal processing method of the fifth embodiment illustrated in FIG. 21. As illustrated in FIG. 28, the signal processing device 100 includes the first to M-th sensors 200-1 to 200-M, M analog front ends 210-1 to 210-M, a processing circuit 110, a storage circuit 120, an operation portion 130, the display portion 140, a sound output portion 150, and a communication portion 160. Note that, the signal processing device 100 may have a configuration in which some of the components in FIG. 28 are omitted or changed, or other components are added. For example, the first to M-th sensors 200-1 to 200-M or the analog front ends 210-1 to 210-M do not have to be components of the signal processing device 100.

Since the configurations and functions of the first to M-th sensors 200-1 to 200-M, the analog front ends 210-1 to 210-M, the storage circuit 120, the operation portion 130, the display portion 140, the sound output portion 150, and the communication portion 160 are the same as those in the first embodiment, the description thereof will be omitted.

By executing the signal processing program 121 that is stored in the storage circuit 120, the processing circuit 110 functions as the measurement data acquisition circuit 111, the measurement data division circuit 112, the averaged data sequence generation circuit 113, the Lissajous figure generation circuit 114, the index value calculation circuit 116, and the abnormality determination circuit 117. That is, the signal processing device 100 includes the measurement data acquisition circuit 111, the measurement data division circuit 112, the averaged data sequence generation circuit 113, the Lissajous figure generation circuit 114, the index value calculation circuit 116, and the abnormality determination circuit 117.

Since the functions of the measurement data acquisition circuit 111, the measurement data division circuit 112, the averaged data sequence generation circuit 113, and the Lissajous figure generation circuit 114 are the same as those in the first embodiment, the description thereof will be omitted.

The index value calculation circuit 116 calculates the index value based on the Lissajous figure generated by the Lissajous figure generation circuit 114. That is, the index value calculation circuit 116 executes the index value calculation step S306 in FIG. 21. The index value calculated by the index value calculation circuit 116 is stored in the storage circuit 120.

The abnormality determination circuit 117 determines the presence or absence of the abnormality in the target object based on the index value calculated by the index value calculation circuit 116. That is, the abnormality determination circuit 117 executes the abnormality determination step S307 in FIG. 21.

The display portion 140 may display the information about the determination result by the abnormality determination circuit 117 based on the display signal output from the processing circuit 110. Further, the sound output portion 150 may generate the sound indicating the determination result by the abnormality determination circuit 117 based on the sound signal output from the processing circuit 110. Further, the communication portion 160 may transmit the information about the determination result by the abnormality determination circuit 117 to the external device.

Figure 29:
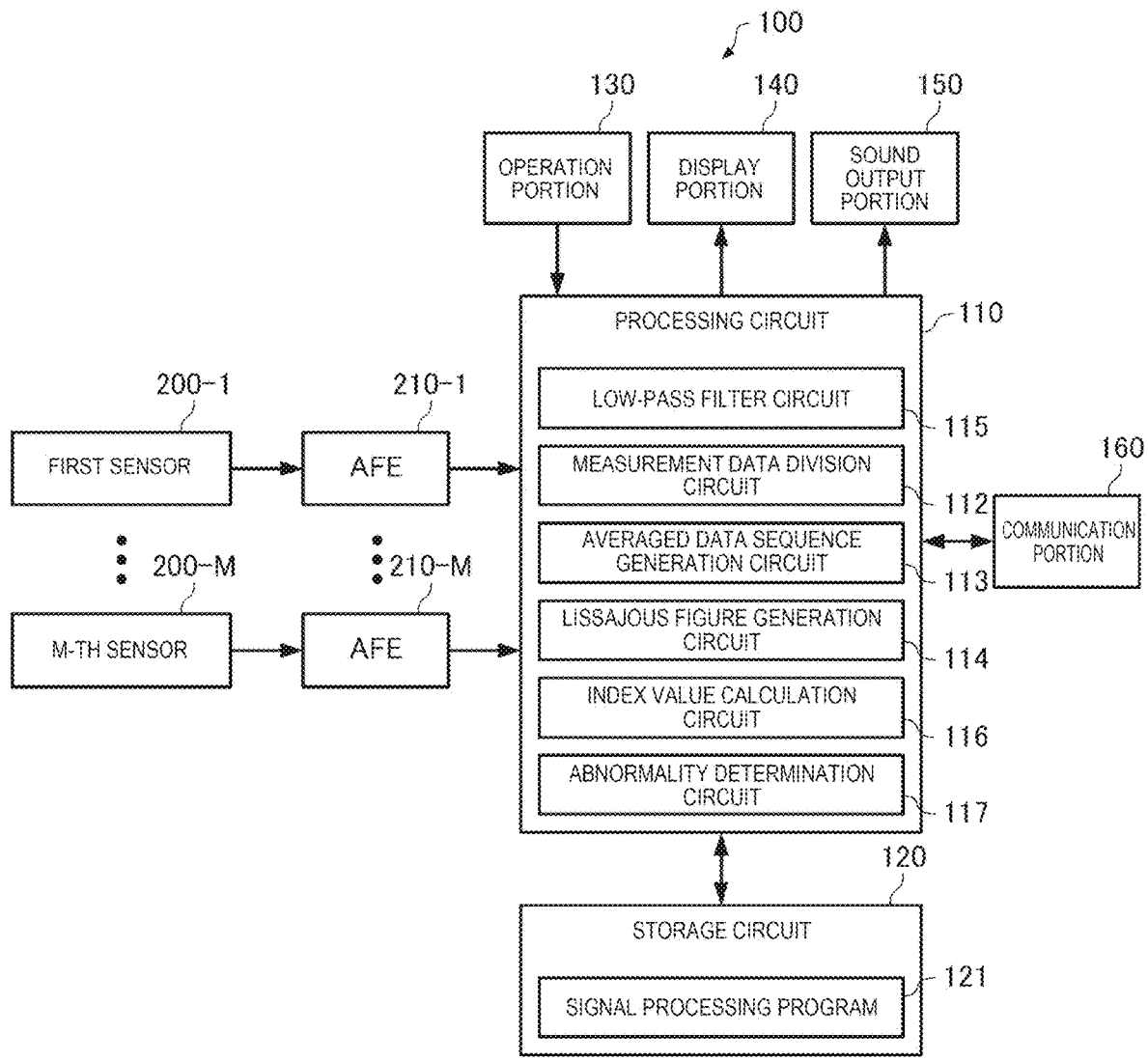
FIG. 29 is a diagram illustrating another example of a configuration of the signal processing device that executes the signal processing method of the fifth embodiment.

FIG. 29 is a diagram illustrating an example of a configuration of the signal processing device 100 that executes the signal processing method of the fifth embodiment illustrated in FIG. 22. As illustrated in FIG. 29, the signal processing device 100 includes the first to M-th sensors 200-1 to 200-M, M analog front ends 210-1 to 210-M, a processing circuit 110, a storage circuit 120, an operation portion 130, the display portion 140, a sound output portion 150, and a communication portion 160. Note that, the signal processing device 100 may have a configuration in which some of the components in FIG. 29 are omitted or changed, or other components are added. For example, the first to M-th sensors 200-1 to 200-M or the analog front ends 210-1 to 210-M do not have to be components of the signal processing device 100.

Since the configurations and functions of the first to M-th sensors 200-1 to 200-M, the analog front ends 210-1 to 210-M, the storage circuit 120, the operation portion 130, the display portion 140, the sound output portion 150, and the communication portion 160 are the same as those in the first embodiment, the description thereof will be omitted.

By executing the signal processing program 121 that is stored in the storage circuit 120, the processing circuit 110 functions as the low-pass filter circuit 115, the measurement data division circuit 112, the averaged data sequence generation circuit 113, the Lissajous figure generation circuit 114, the index value calculation circuit 116, and the abnormality determination circuit 117. That is, the signal processing device 100 includes the low-pass filter circuit 115, the measurement data division circuit 112, the averaged data sequence generation circuit 113, the Lissajous figure generation circuit 114, the index value calculation circuit 116, and the abnormality determination circuit 117.

Since the functions of the low-pass filter circuit 115, the measurement data division circuit 112, the averaged data sequence generation circuit 113, and the Lissajous figure generation circuit 114 are the same as those in the first embodiment, the description thereof will be omitted.

The index value calculation circuit 116 calculates the index value based on the Lissajous figure generated by the Lissajous figure generation circuit 114. That is, the index value calculation circuit 116 executes the index value calculation step S306 in FIG. 21. The index value calculated by the index value calculation circuit 116 is stored in the storage circuit 120.

The abnormality determination circuit 117 determines the presence or absence of the abnormality in the target object based on the index value calculated by the index value calculation circuit 116. That is, the abnormality determination circuit 117 executes the abnormality determination step S307 in FIG. 21.

The display portion 140 may display the information about the determination result by the abnormality determination circuit 117 based on the display signal output from the processing circuit 110. Further, the sound output portion 150 may generate the sound indicating the determination result by the abnormality determination circuit 117 based on the sound signal output from the processing circuit 110. Further, the communication portion 160 may transmit the information about the determination result by the abnormality determination circuit 117 to the external device.

According to the fifth embodiment described above, the same effect as the signal processing method of the first embodiment to the fourth embodiment can be obtained. Further, according to the fifth embodiment, the signal processing device 100 can accurately calculate the index value because a stable Lissajous figure with reduced fluctuation can be obtained, and based on the index value calculated with high accuracy, the presence or absence of abnormality of the target object can be accurately determined.

2. Monitoring System

Hereinafter, regarding a monitoring system of the present embodiment, the same components as those described in any of the above embodiments are designated by the same reference numerals, the description overlapping with any of the above embodiments is omitted or simplified, and the contents different from any of the above-described embodiments will be described mainly.

Figure 30:
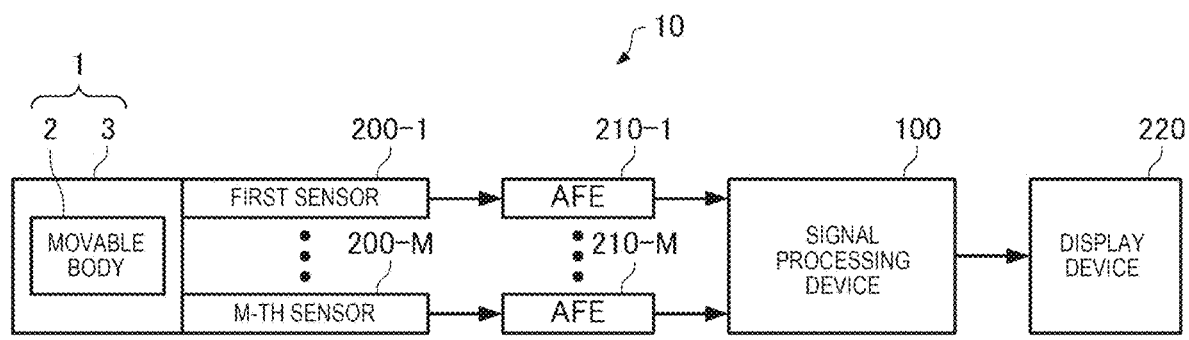
FIG. 30 is a diagram illustrating an example of a configuration of a monitoring system of the present embodiment.

FIG. 30 is a diagram illustrating an example of a configuration of a monitoring system of the present embodiment. As illustrated in FIG. 30, the monitoring system 10 of the present embodiment includes the first to M-th sensors 200-1 to 200-M, the M analog front ends 210-1 to 210-M, the signal processing device 100, and the display device 220, and monitors a state of a target object 1.

The target object 1 includes a movable body 2 and a housing 3 for accommodating the movable body 2. Each of the first to M-th sensors 200-1 to 200-M is attached to the housing 3, detects the physical quantity generated due to the vibration of the target object 1, and outputs a signal having a magnitude corresponding to the detected physical quantity. Each of the output signals of the first to M-th sensors 200-1 to 200-M is input to each of the analog front ends 210-1 to 210-M.

Each of the analog front ends 210-1 to 210-M performs amplification processing, A/D conversion processing, or the like with respect to each of the output signals of the first to M-th sensors 200-1 to 200-M and outputs a digital time series signal.

The signal processing device 100 acquires the M digital time series signals, which are output from the analog front ends 210-1 to 210-M, as the first to M-th measurement data $D_1$ to $D_M$, generates the Lissajous figure, and displays the generated Lissajous figure on the display device 220. The display device 220 may be a device separated from the signal processing device 100 or may be a display portion included in the signal processing device 100. Note that, when the first to M-th sensors 200-1 to 200-M output digital time series signals, since the signal processing device 100 may acquire the M digital time series signals as the first to M-th measurement data $D_1$ to $D_M$, the analog front ends 210-1 to 210-M may be omitted. As the signal processing device 100, for example, the signal processing device 100 according to any one of the above-described first to fifth embodiments can be applied.

Figure 31:
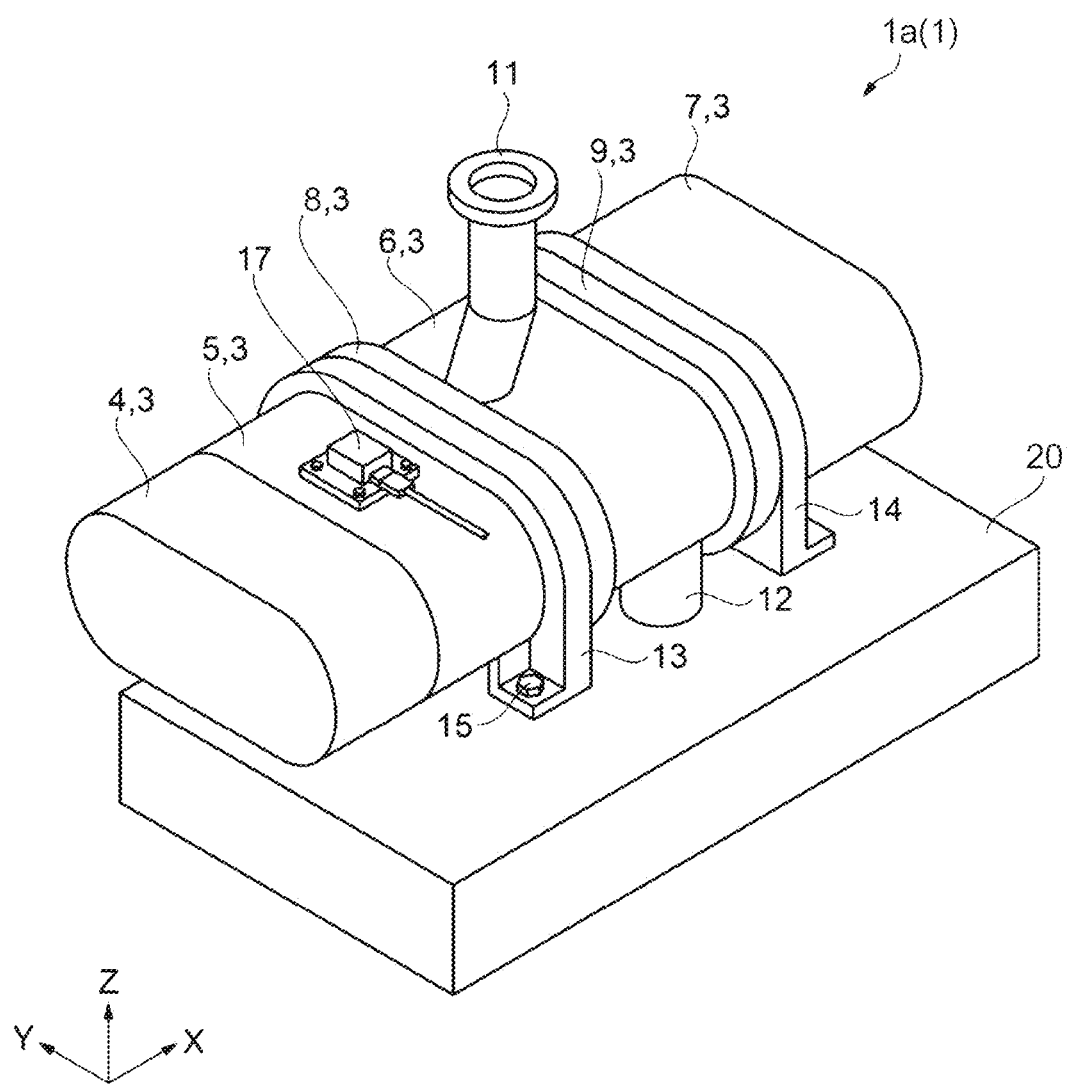
FIG. 31 is a schematic perspective diagram illustrating a configuration of a vacuum pump.

FIG. 31 illustrates a vacuum pump 1a, which is an example of the target object 1. As illustrated in FIG. 31, the vacuum pump 1a is installed on the base 20. The vacuum pump 1a has a columnar shape having a substantially elliptical cross section. The longitudinal direction of the vacuum pump 1a is the X direction. The elliptical major axis direction is the Y direction, and the elliptical minor axis direction is the Z direction.

The vacuum pump 1a includes the housing 3. The housing 3 includes a motor case 4, a coupling portion 5, a pump case 6, and a gear case 7 disposed from the -X direction side to the +X direction side. The housing 3 includes a first side wall 8 as a bearing casing between the coupling portion 5 and the pump case 6. The housing 3 includes a second side wall 9 between the pump case 6 and the gear case 7.

An intake pipe 11 is coupled to a surface of the pump case 6 on the +Z direction side. An exhaust pipe 12 is coupled to a surface of the pump case 6 on the -Z direction side.

The coupling portion 5 includes a first leg portion 13 and a second leg portion on the base 20 side. The first leg portion 13 is disposed on the -Y direction side, and the second leg portion is disposed on the +Y direction side. The gear case 7 includes a third leg portion 14 and a fourth leg portion on the base 20 side. The third leg portion 14 is disposed on the -Y direction side, and the fourth leg portion is disposed on the +Y direction side. The first leg portion 13 to the fourth leg portion are fastened to the base 20 by a first bolt 15.

A sensor unit 17 is attached to the housing 3. The sensor unit 17 is attached to, for example, the coupling portion 5. The sensor unit 17 includes the first to M-th sensors 200-1 to 200-M (not illustrated) inside the sensor unit 17. For example, the first sensor 200-1 may be a speed sensor that detects the speed in the X axis direction, the second sensor 200-2 may be a speed sensor that detects the speed in the Y axis direction, and the third sensor 200-3 may be a speed sensor that detects the speed in the Z axis direction.

Figure 32:
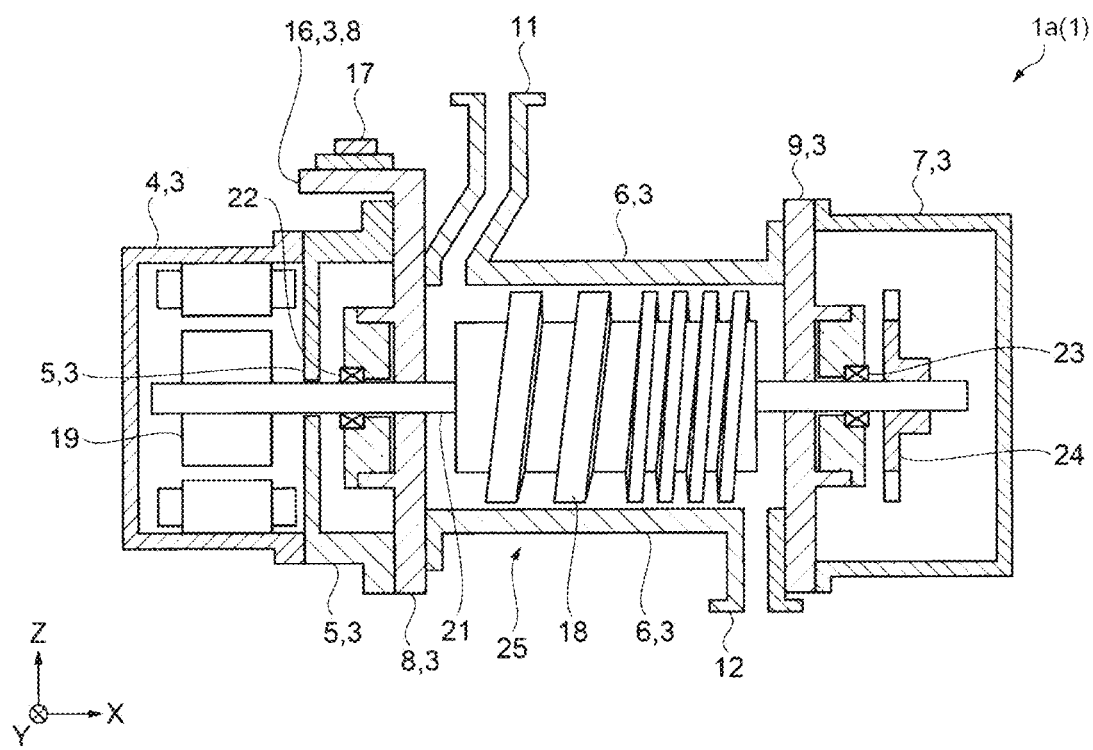
FIG. 32 is a schematic side sectional diagram illustrating an internal structure of the vacuum pump.
Figure 33:
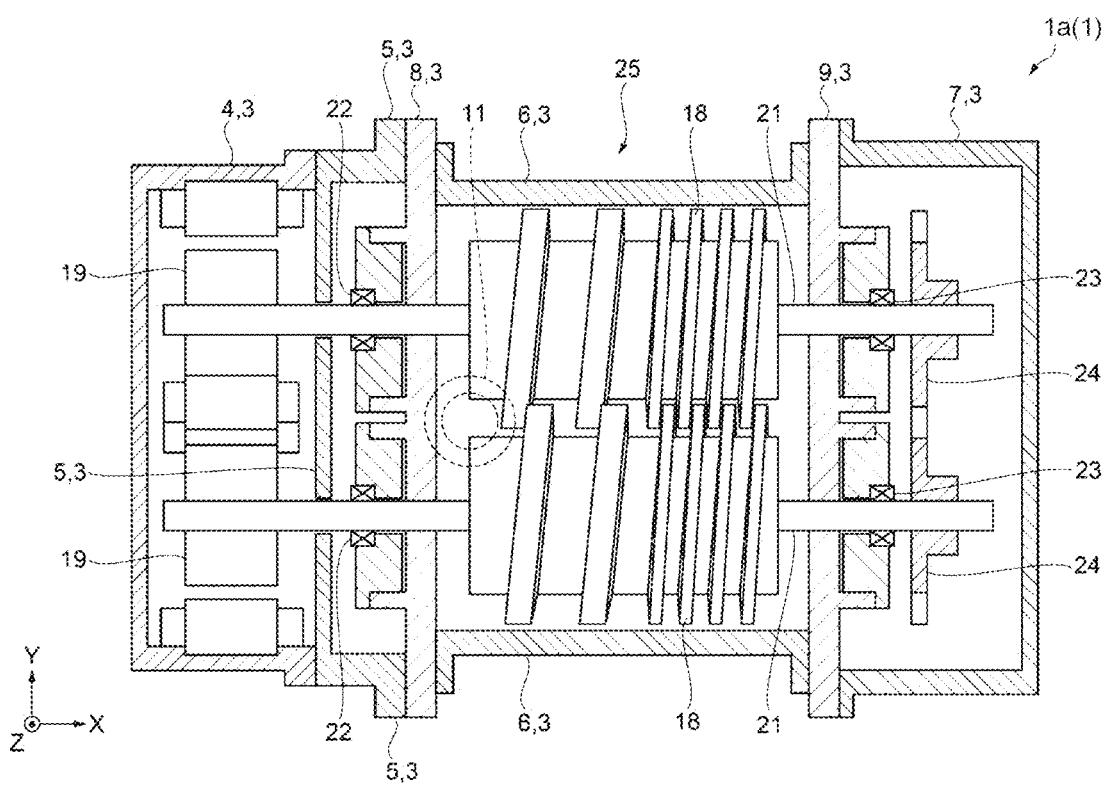
FIG. 33 is a schematic plan sectional diagram illustrating the internal structure of the vacuum pump.

The internal structure of the vacuum pump 1a will be described with reference to FIGS. 32 and 33. FIG. 32 is a view seen from the -Y direction. FIG. 33 is a view seen from the +Z direction. In the figure, the first leg portion 13 to the fourth leg portion are omitted. The vacuum pump 1a includes pump rotors 18 as two movable bodies 2 for transferring gas and two motors 19 for rotating the two pump rotors 18. The housing 3 accommodates the pump rotor 18.

The two pump rotors 18 have two rotating shafts 21. The two rotating shafts 21 are rotatably supported by a first bearing 22 and a second bearing 23 as bearings, respectively. Each of the two motors 19 is coupled to one end of the rotating shaft 21. The motor 19 is configured to rotate the two pump rotors 18 in synchronization with each other in opposite directions. Two timing gears 24 are fixed to the other end of the rotating shaft 21. The timing gear 24 is provided to ensure the synchronous rotation of the two pump rotors 18 when the synchronous rotation of the two motors 19 is lost.

The pump case 6 is interposed between the first side wall 8 and the second side wall 9. The pump rotor 18 is disposed in a pump chamber 25 configured with the pump case 6, the first side wall 8, and the second side wall 9.

The first side wall 8 supports the first bearing 22 on the intake pipe 11 side. The first bearing 22 is disposed in the coupling portion 5. The motor 19 is disposed in the motor case 4 that is fixed to the coupling portion 5. The second bearing 23 on the exhaust pipe 12 side is fixed to the second side wall 9. The timing gear 24 and the second bearing 23 are disposed in the gear case 7. The rotation of the pump rotor 18 causes the first bearing 22 and the second bearing 23 to vibrate. The vibrations of the first bearing 22 and the second bearing 23 are transmitted to the housing 3 such as the coupling portion 5 via the first side wall 8 and the second side wall 9. The first to M-th sensors 200-1 to 200-M built in the sensor unit 17 detect the vibration transmitted to the housing 3.

According to the monitoring system 10 of the present embodiment, the signal processing device 100 can generate the stable Lissajous figure with reduced fluctuations based on the first to M-th measurement data $D_1$ to $D_M$ based on the signals output from the first to M-th sensors 200-1 to 200-M, and display the Lissajous figure on the display device 220. Therefore, the user can monitor the state of the target object 1 based on the time change of the Lissajous figure displayed on the display device 220 and can accurately determine the presence or absence of the abnormality in the target object 1.

3. Modification Example

For example, the user may be able to select the processing of the measurement data division step in the signal processing methods of the first to fifth embodiments described above.

Further, the signal processing device 100 may perform the following processing in the measurement data division step. First, the signal processing device 100 selects a predetermined number of peak values of the intensity included in the i-th FFT data $D_{FFTi}$ from the largest ones. Next, the signal processing device 100 divides the i-th measurement data $D_i$ into the N data sequences $D_{i-1}$ to $D_{i-N}$ based on the frequency of each of the selected peak values. Next, the signal processing device 100 calculates the variation of each of the data sequences $D_{i-1}$ to $D_{i-N}$, for example, the variance, for each of the selected peak values. Thereafter, the signal processing device 100 selects the N data sequences $D_{i-1}$ to $D_{i-N}$ having the smallest variation. In this way, the signal components of the fundamental wave are included in the N data sequences $D_{i-1}$ to $D_{i-N}$, and a stable Lissajous figure is generated.

The above-described embodiments and modification examples are just examples, and the disclosure is not limited thereto. For example, each embodiment and the modification example may also be appropriately combined with each other.

The present disclosure includes substantially the same configurations (for example, configurations having the same functions, methods, and results, or configurations having the same objects and effects) as the configurations described in the embodiments. In addition, the present disclosure includes a configuration obtained by replacing non-essential portions in the configurations described in the embodiments. Further, the present disclosure includes a configuration that exhibits the same operational effects as those of the configurations described in the embodiments or a configuration capable of achieving the same objects. The present disclosure includes a configuration obtained by adding known techniques to the configurations described in the embodiments.

The following contents are derived from the above-described embodiments and modification examples.

A signal processing method according to one aspect includes: a measurement data division step of generating N data sequences by dividing i-th measurement data based on a signal output from an i-th sensor that detects a physical quantity generated due to a vibration of a target object, for each integer i of 1 or more and M or less; an averaged data sequence generation step of generating an i-th averaged data sequence by averaging the N data sequences generated by dividing the i-th measurement data, for each integer i of 1 or more and M or less; and a Lissajous figure generation step of generating a Lissajous figure in which the i-th averaged data sequence is assigned to an i-th axis, for each integer i of 1 or more and M or less, where N is a predetermined integer of 2 or more, and M is a predetermined integer of 2 or more.

In the signal processing method, the signal processing device 100 does not generate the Lissajous figure by assigning the i-th measurement data to the i-th axis as it is but generates the Lissajous figure by assigning the i-th averaged data sequence obtained by averaging the N data sequences, which is generated by dividing the i-th measurement data, to the i-th axis. Therefore, according to the signal processing method, by using the averaging, the high frequency or low frequency noise components included in the i-th measurement data are reduced, and the signal components based on the vibration of the target object is emphasized so that a stable Lissajous figure with reduced fluctuation can be obtained.

In one aspect of the signal processing method, in the measurement data division step, i-th FFT data may be generated by performing a fast Fourier transform on the i-th measurement data, for each integer i of 1 or more and M or less, a cycle of a signal component having a maximum intensity may be calculated based on the first to M-th FFT data, and the N data sequences may be generated by dividing the i-th measurement data at a time interval n times the cycle, for each integer i of 1 or more and M or less, where n is an integer of 1 or more.

According to the signal processing method, the Lissajous figure in which the characteristics of the signal component having the maximum intensity included in the first to M-th measurement data are emphasized can be obtained.

In one aspect of the signal processing method, in the measurement data division step, i-th FFT data may be generated by performing a fast Fourier transform on the i-th measurement data, for each integer i of 1 or more and M or less, a cycle of a signal component having a maximum intensity may be calculated based on a value obtained by dividing each peak value of intensity, which is included in the first to M-th FFT data, by a frequency corresponding to the peak value, and the N data sequences may be generated by dividing the i-th measurement data at a time interval n times the cycle, for each integer i of 1 or more and M or less, where n is an integer of 1 or more.

In the signal processing method, by dividing each peak value of the intensity by the frequency corresponding to the peak value, the ratio of the intensity of the signal component of the low frequency with respect to the intensity of the signal component of the high frequency becomes large, thereby the intensity of the signal component of the low frequency tends to be maximized. Therefore, according to the signal processing method, the Lissajous figure in which the characteristics of the signal components of the low frequency included in the first to M-th measurement data are emphasized, can be obtained. Since the signal component of the low frequency is likely to be affected by the characteristics or changes in a state of the target object, the user can correctly recognize the characteristics or changes in the state of the target object based on the Lissajous figure.

In one aspect of the signal processing method, the integer n may be 2 or more.

In the signal processing method, even when the intensity of the second-order harmonic with respect to the fundamental wave of the vibration of the target object is the maximum in the i-th measurement data, the N data sequences, which are generated by dividing the i-th measurement data, include the signal components of the fundamental wave. Therefore, according to the signal processing method, a Lissajous figure having the characteristics of the signal component of the fundamental wave can be obtained.

In one aspect of the signal processing method, in the measurement data division step, the N data sequences may be generated by dividing the i-th measurement data at a designated time interval, for each integer i of 1 or more and M or less.

Further, according to the signal processing method, when the cycle of the fundamental wave of the vibration of the target object is known, by designating the cycle of the fundamental wave and dividing the first to M-th measurement data, the Lissajous figure having the characteristics of the signal component of the fundamental wave can be obtained.

One aspect of the signal processing method may include a low-pass filter step of generating the i-th measurement data by performing low-pass filter processing on data based on a signal output from the i-th sensor, for each integer i of 1 or more and M or less.

According to the signal processing method, the fluctuation of the high frequency noise is reduced by the low-pass filter processing so that the Lissajous figure in which the low frequency signal component is emphasized can be obtained. Since the signal component of the low frequency is likely to be affected by the characteristics or changes in a state of the target object, the user can correctly recognize the characteristics or changes in the state of the target object based on the Lissajous figure.

In one aspect of the signal processing method, in the averaged data sequence generation step, the i-th averaged data sequence may be generated by converting time of each data with time of head data as common time for each of the N data sequences generated by dividing the i-th measurement data, for each integer i of 1 or more and M or less, and averaging the N data sequences having the same time.

According to the signal processing method, by averaging the N data sequences, which are generated by dividing the i-th measurement data, in order from the head N data sequences, the signal components based on the vibration of the target object are synchronized, thereby the processing load required for synchronization is reduced.

One aspect of the signal processing method may include an index value calculation step of calculating an index value based on the Lissajous figure, and an abnormality determination step of determining presence or absence of an abnormality in a target object based on a time change of the index value.

According to the signal processing method, the presence or absence of abnormality of the target object can be accurately determined based on the stable Lissajous figure with reduced fluctuations.

One aspect of the signal processing method may include a display step of displaying the N data sequences, which are generated by dividing the i-th measurement data for each integer i of 1 or more and M or less, and the Lissajous figure on a display portion.

According to the signal processing method, when the variations of the N data sequences displayed on the display portion are small, the user can determine that the Lissajous figure having the characteristics of the fundamental wave of the vibration of the target object is obtained, and can correctly recognize the state of the target object based on the Lissajous figure.

A signal processing device according to one aspect includes: a measurement data division circuit generating N data sequences by dividing i-th measurement data based on a signal output from an i-th sensor that detects a physical quantity generated due to a vibration of a target object, for each integer i of 1 or more and M or less; an averaged data sequence generation circuit generating an i-th averaged data sequence obtained by averaging the N data sequences generated by dividing the i-th measurement data, for each integer i of 1 or more and M or less; and a Lissajous figure generation circuit generating a Lissajous figure in which the i-th averaged data sequence is assigned to an i-th axis, for each integer i of 1 or more and M or less, where N is a predetermined integer of 2 or more and M is a predetermined integer of 2 or more.

The signal processing device does not generate the Lissajous figure by assigning the i-th measurement data to the i-th axis as it is but generates the Lissajous figure by assigning the i-th averaged data sequence obtained by averaging the N data sequences, which are generated by dividing the i-th measurement data, to the i-th axis. Therefore, according to the signal processing device, by the averaging, the high frequency or low frequency noise components included in the i-th measurement data are reduced, and the signal components based on the vibration of the target object are emphasized so that a stable Lissajous figure with reduced fluctuation can be obtained.

A monitoring system according to one aspect, that monitors a state of a target object including a movable body and a housing that accommodates the movable body, the monitoring system includes: the signal processing device according to the aspect; and the first to M-th sensors attached to the housing, in which the signal processing device displays the Lissajous figure on a display device.

According to the monitoring system, the signal processing device can generate the stable Lissajous figure with reduced fluctuations based on the first to M-th measurement data based on the signals output from the first to M-th sensors, and display the Lissajous figure on the display device. Therefore, the user can monitor the state of the target object based on the time change of the Lissajous figure displayed on the display device and can accurately determine the presence or absence of the abnormality in the target object.

What is claimed is:

1. A signal processing method for causing a processing circuit to execute a process, the signal processing method comprising executing on the processing circuit the steps of:
    acquiring, as i-th measurement data, time series data of a digital signal converted by an analog front end from an analog signal, the analog signal being output from an i-th sensor that detects a physical quantity generated due to a vibration of a vacuum pump assembly, for each integer i of 1 or more and M or less, where M is a predetermined integer of 2 or more, the vacuum pump assembly having a motor case housing a motor, a pump case housing a pump driven by the motor, and a coupling portion coupling between the vacuum case and the pump case, the i-th sensor being attached to the coupling portion;
    generating N data sequences by dividing the i-th measurement data, where N is a predetermined integer of 2 or more;
    generating an i-th averaged data sequence by averaging the N data sequences generated by dividing the i-th measurement data, for each integer i of 1 or more and M or less;
    generating a Lissajous figure in which the i-th averaged data sequence is assigned to an i-th axis, for each integer i of 1 or more and M or less;
    displaying the Lissajous figure on a display device;
    calculating an index value based on the Lissajous figure; and
    determining presence or absence of an abnormality in the vacuum pump assembly based on a time change of the index value.

2. The signal processing method according to claim 1, wherein
    i-th FFT data is generated by performing a fast Fourier transform on the i-th measurement data, for each integer i of 1 or more and M or less,
    a cycle of a signal component having a maximum intensity is calculated based on the first to M-th FFT data, and
    the N data sequences are generated by dividing the i-th measurement data at a time interval n times the cycle, for each integer i of 1 or more and M or less, where n is an integer of 1 or more.

3. The signal processing method according to claim 2, wherein the integer n is 2 or more.

4. The signal processing method according to claim 1, wherein i-th FFT data is generated by performing a fast Fourier transform on the i-th measurement data, for each integer i of 1 or more and M or less, a cycle of a signal component having a maximum intensity is calculated based on a value obtained by dividing each peak value of intensity, which is included in the first to M-th FFT data, by a frequency corresponding to the peak value, and the N data sequences are generated by dividing the i-th measurement data at a time interval n times the cycle, for each integer i of 1 or more and M or less, where n is an integer of 1 or more.

5. The signal processing method according to claim 1, wherein
the N data sequences are generated by dividing the i-th measurement data at a designated time interval, for each integer i of 1 or more and M or less.

6. The signal processing method according to claim 1, further comprising:
generating the i-th measurement data by performing low-pass filter processing on data based on a signal output from the i-th sensor, for each integer i of 1 or more and M or less.

7. The signal processing method according to claim 1, wherein
time of each data is converted with time of head data as common time for each of the N data sequences generated by dividing the i-th measurement data, for each integer i of 1 or more and M or less, and
the N data sequences having the same time are averaged, to generate the i-th averaged data sequence.

8. The signal processing method according to claim 1, further comprising:
displaying the N data sequences, which are generated by dividing the i-th measurement data for each integer i of 1 or more and M or less, on the display device.

9. The signal processing device according to claim 1, wherein
the processing circuit is further configured to generate sound via a speaker when the processing circuit determines the presence of the abnormality in the vacuum pump assembly.

10. A signal processing device comprising:
a memory configured to store a program; and
a processing circuit configured to execute the program so as to:

acquire, as i-th measurement data, time series data of a digital signal converted by an analog front end from an analog signal, the analog signal being output from an i-th sensor that detects a physical quantity generated due to a vibration of a vacuum pump assembly, for each integer i of 1 or more and M or less, where M is a predetermined integer of 2 or more, the vacuum pump assembly having a motor case housing a motor, a pump case housing a pump driven by the motor, and a coupling portion coupling between the vacuum case and the pump case, the i-th sensor being attached to the coupling portion;

generate N data sequences by dividing the i-th measurement data, where N is a predetermined integer of 2 or more;

generate an i-th averaged data sequence obtained by averaging the N data sequences generated by dividing the i-th measurement data, for each integer i of 1 or more and M or less;

generate a Lissajous figure in which the i-th averaged data sequence is assigned to an i-th axis, for each integer i of 1 or more and M or less;

display the Lissajous figure on a display device;

calculate an index value based on the Lissajous figure; and determine presence or absence of an abnormality in the vacuum pump assembly based on a time change of the index value.

11. A monitoring system that monitors a state of the vacuum pump assembly, the monitoring system comprising:
the signal processing device according to claim 10; and
the first to M-th sensors attached to the housing.

12. The monitoring system according to claim 11, wherein
the processing circuit is further configured to generate sound via a speaker when the processing circuit determines the presence of the abnormality in the vacuum pump assembly.

13. The signal processing method according to claim 10, wherein
the processing circuit is further configured to generate sound via a speaker when the processing circuit determines the presence of the abnormality in the vacuum pump assembly.

* * * * *